US010338931B2

(12) United States Patent
Gupta et al.

(10) Patent No.: US 10,338,931 B2
(45) Date of Patent: Jul. 2, 2019

(54) APPROXIMATE SYNCHRONIZATION FOR PARALLEL DEEP LEARNING

(71) Applicant: International Business Machines Corporation, Armonk, NY (US)

(72) Inventors: Suyog Gupta, White Plains, NY (US); Ravi Nair, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 353 days.

(21) Appl. No.: 15/142,553

(22) Filed: Apr. 29, 2016

(65) Prior Publication Data
US 2017/0351530 A1      Dec. 7, 2017

(51) Int. Cl.
*G06F 9/46*          (2006.01)
*G06F 9/4401*     (2018.01)
(Continued)

(52) U.S. Cl.
CPC ........ *G06F 9/4405* (2013.01); *G06F 9/30087* (2013.01); *H04W 56/001* (2013.01); *G06F 9/3885* (2013.01); *G06N 20/00* (2019.01)

(58) Field of Classification Search
CPC ............ G06F 9/45405; G06F 9/30087; H04W 56/001; G06N 99/005
See application file for complete search history.

(56) References Cited
U.S. PATENT DOCUMENTS

| 6,092,130 A * | 7/2000 | Horiike ................... H04N 7/52 341/67 |
| 8,768,870 B1 | 7/2014 | Corrado et al. |

(Continued)

OTHER PUBLICATIONS

Park, et al., "A 1.93TOPS/W Scalable Deep Learning/Inference Processor with Tetra-Parellel MIMD Architecture for Big-Data Applications," 2015 IEEE International Solid-State Circuits Conference, Feb. 23, 2015, 3 pages.
(Continued)

*Primary Examiner* — Camquy Truong
(74) *Attorney, Agent, or Firm* — Amin, Turocy & Watson, LLP

(57) ABSTRACT

Techniques facilitating synchronization of processing engines for parallel deep learning are provided. In one example, a first processing component associated with a processor and processing components can: generate first output data based on input data associated with a machine learning process, wherein the processing components are communicatively coupled with an assignment component via a network; transmit the first output data to a second processing component of the processing components, wherein the first processing component and the second processing component comprise a first group of the processing components and the first group of the processing components is determined by the assignment component based on a first defined criterion; receive communication data generated by the second processing component; and generate second output data based on the communication data, wherein the second output data is an updated version of the first output data stored in the memory of the first processing component.

17 Claims, 16 Drawing Sheets

(51) Int. Cl.
*G06F 9/30* (2018.01)
*H04W 56/00* (2009.01)
*G06F 9/38* (2018.01)
*G06N 20/00* (2019.01)

(56) References Cited

U.S. PATENT DOCUMENTS

| | | | | |
|---|---|---|---|---|
| 8,918,509 | B1* | 12/2014 | Pakyari | .......... G06F 9/505 709/201 |
| 2009/0210371 | A1 | 8/2009 | van der Laan | |
| 2013/0096892 | A1 | 4/2013 | Essa et al. | |
| 2013/0282634 | A1 | 10/2013 | Deng et al. | |
| 2014/0047454 | A1* | 2/2014 | Oliver | .......... G06F 9/5083 718/104 |
| 2014/0067738 | A1 | 3/2014 | Kingsbury | |
| 2015/0100530 | A1 | 4/2015 | Mnih et al. | |
| 2015/0324690 | A1 | 11/2015 | Chilimbi et al. | |
| 2015/0339571 | A1 | 11/2015 | Krizhevsky et al. | |

OTHER PUBLICATIONS

IBM, "A Neural Net to Improve Turn Around Time of Validation Testing," IP.com Prior Art Database Technical Disclosure, Nov. 29, 2005, 4 pages.

"System and Methods for Stacking Based Ensemble Pruning," IP.com Prior Art Database Technical Disclosure, Jul. 25, 2012, 8 pages.

Ho, et al., "More Effective Distributed ML via a Stale Synchronous Parallel Parameter Server," Advances in Neural Information Processing Systems, 2013, 9 pages.

Dean, et al., "Large Scale Distributed Deep Networks," Last Accessed: Mar. 20, 2019, Google Inc., Mountain View, CA, 11 pages.

* cited by examiner

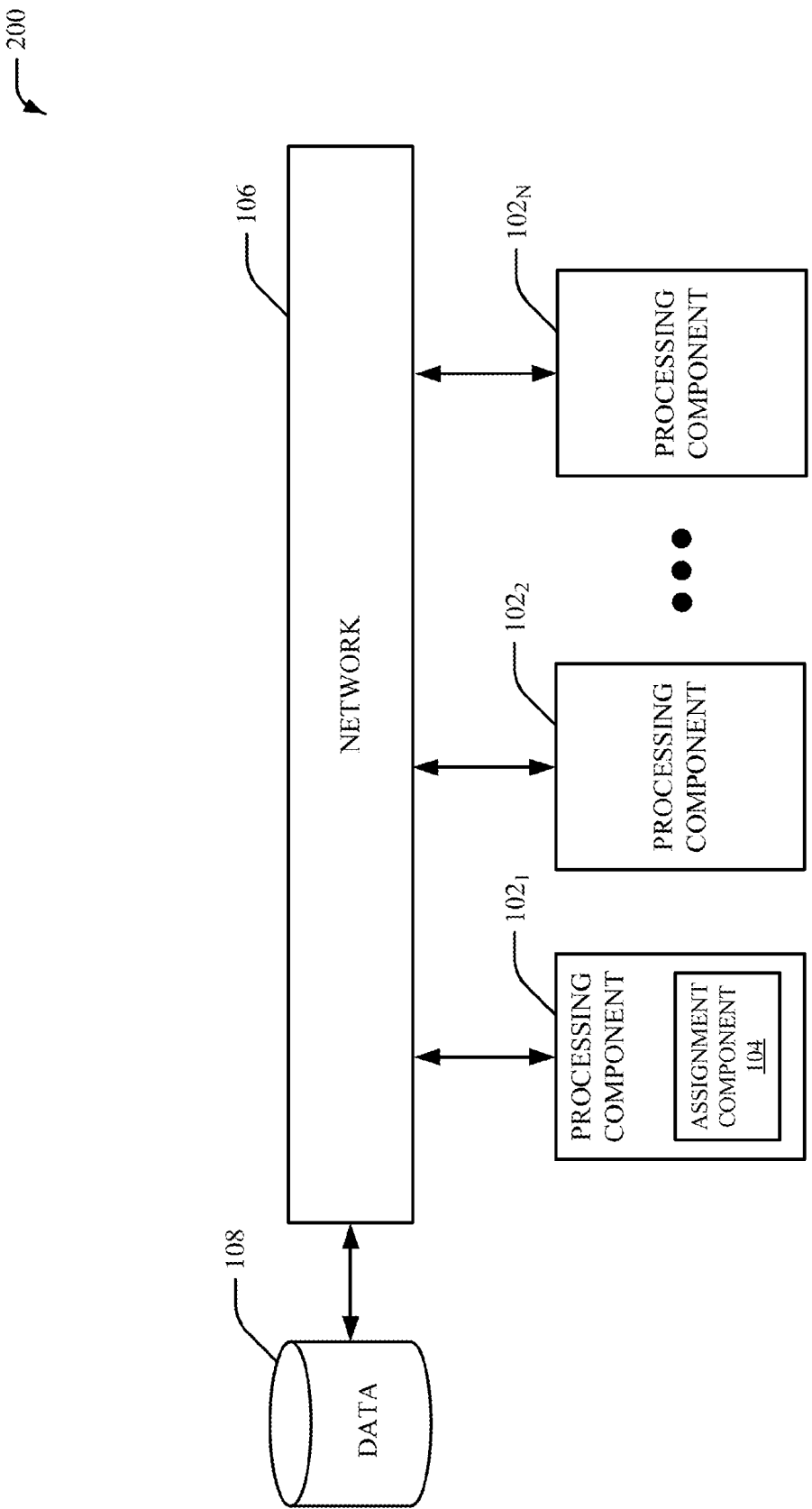

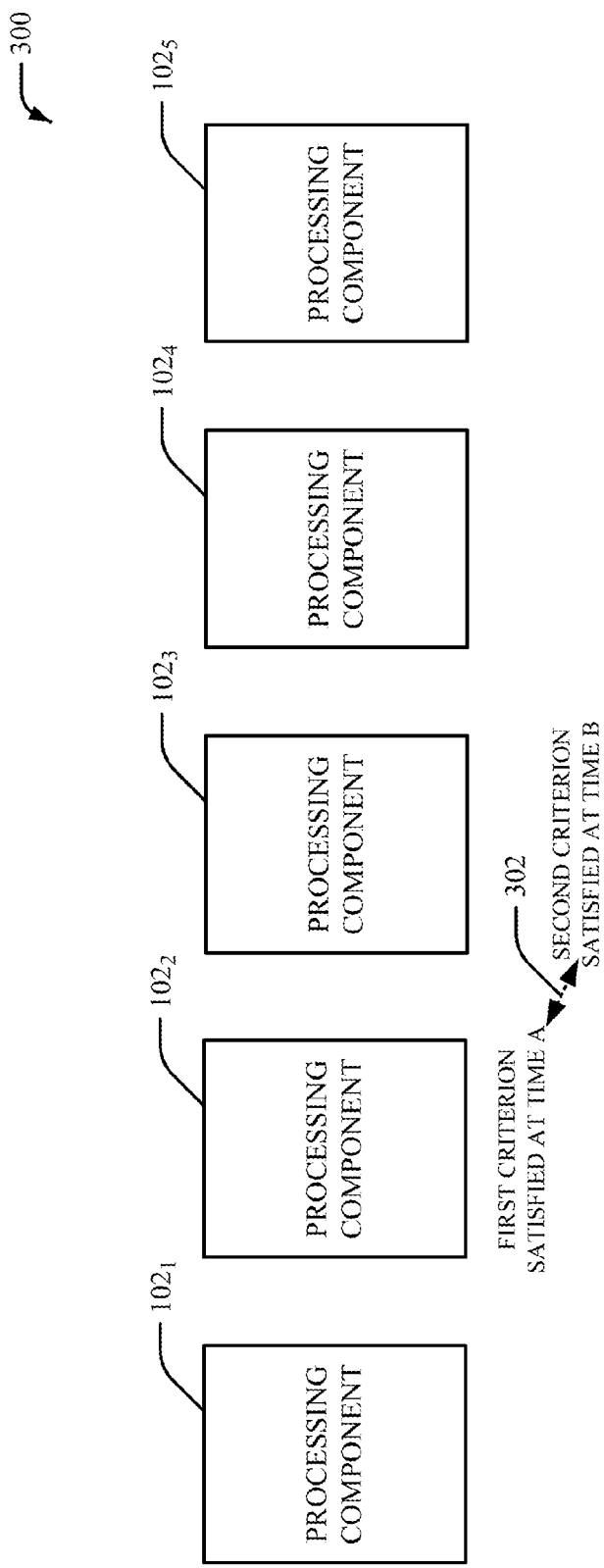

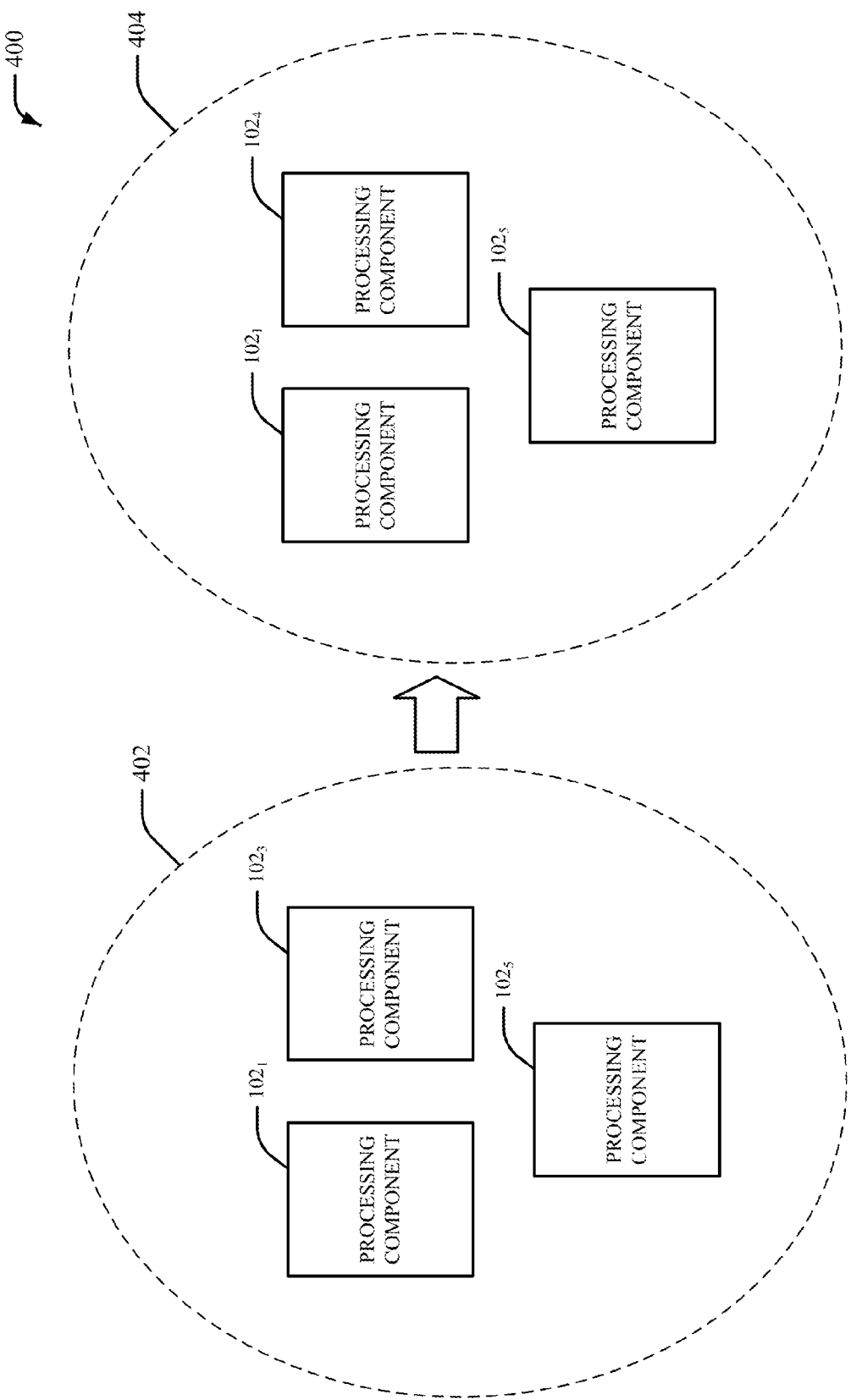

APPROXIMATE SYNCHRONIZATION FOR PARALLEL DEEP LEARNING

STATEMENT REGARDING FEDERALLY SPONSORED RESEARCH OR DEVELOPMENT

This invention was made with Government support under Contract No.: FA8750-15-C-0125 awarded by Defense Advanced Research Projects Agency (DARPA). The Government has certain rights to this invention.

BACKGROUND

The subject disclosure relates to deep learning, and more specifically, to parallel processing to facilitate deep learning.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate synchronization of processing components for parallel deep learning are described.

According to an embodiment, a system can comprise a memory that stores computer executable components; and a processor that executes computer executable components stored in the memory. The computer executable components can comprise a computing component that generates first data based on input data provided to a set of processing engines. The computer executable components can also comprise a communication component that: determines a first subset of processing engines from the set of processing engines, transmits the first data to the first subset of processing engines, receives first output data generated by the first subset of processing engines, and transmits second data to a second subset of processing engines from the set of processing engine. The second data can be generated by the computing component based on the first data and the first output data. Furthermore, the first data and the second data can be stored in the memory or another memory associated with the system.

According to an embodiment, a computer-implemented method can comprise generating, by a first processing component comprising a processor and associated with processing components, first output data based on input data associated with a machine learning process. The first output data can be stored in a memory operatively coupled to the first processing component and the processing components can be communicatively coupled with an assignment component via a network. The computer-implemented method can also comprise transmitting, by the first processing component, the first output data to a second processing component of the processing components. The first processing component and the second processing component can include a first group of the processing components and the first group of the processing components can be determined by the assignment component based on a first defined criterion. The computer-implemented method can also comprise: receiving, by the first processing component, communication data generated by the second processing component; and generating, by the first processing component, second output data based on the communication data. The second output data can be an updated version of the first output data stored in the memory of the first processing component.

According to another embodiment, a computer-implemented method can comprise assigning, by an assignment component comprising a processor, a first processing component and a second processing component to a first group of processing components to exchange output data generated based on input data provided to the first processing component and the second processing component. The first processing component and the second processing component can be communicatively coupled to the assignment component via a network. The first processing component and the second processing component can be selected for the first group by the assignment component based on a determination that the first processing component and the second processing component satisfy a defined criterion associated with the input data. The computer-implemented method can also comprise: determining, by the assignment component, that the first processing component satisfies another defined criterion associated with the input data and the output data; and assigning, by the assignment component, the first processing component to a second group of the processing components to exchange other output data associated with the input data. The second group of the processing components can include a third processing component that fails to be included in the first group of the processing components.

According to yet another embodiment, a computer program product for deep learning can comprise a computer readable storage medium having program instructions embodied therewith. The program instructions can be executable by a processing component and cause the processing component to: generate, by the processing component, first output data based on first input data associated with machine learning and received by the processing component and one or more other processing components; and transmit, by the processing component, the first output data to a first processing component from the one or more other processing components, wherein the first processing component is determined by the processing component or the one or more other processing components, wherein the processing component and the first processing component are operated in synchronization for the deep learning, and wherein the first output data is stored in a memory operatively coupled to the processing component. The program instructions can also be executable to: generate, by the processing component, second output data based on the first output data and communication data generated by the first processing component; and transmit, by the processing component, the second output data to a second processing component from the one or more other processing components, wherein the second processing component is determined by the processing component or the one or more other processing components, and wherein the processing component and the second processing component are operated in synchronization for the deep learning.

According to yet another embodiment, a computer program product for managing deep learning associated with a set of processing engines can comprise a computer readable storage medium having program instructions embodied therewith. The program instructions can be executable by an assignment component and cause the assignment component to: determine that a first processing engine in communication with the assignment component via a network satisfies a defined criterion, assign the first processing engine and the second processing engine to a first set of processing engines to allow a first exchange of first output data between the first processing engine and a second processing engine in communication with the assignment component via the network, and assign the first processing engine to a second set of processing engine based on another defined criterion to allow a second exchange of second output data between the first processing engine and a third processing engine. The first processing engine and the second processing engine can perform the first exchange to facilitate the deep learning, and the first processing engine and the third processing engine can perform the second exchange to facilitate the deep learning. The first processing engine can include the assignment component.

DESCRIPTION OF THE DRAWINGS

FIG. 2 illustrates another block diagram of an example, non-limiting system that facilitates deep learning in accordance with one or more embodiments described herein.

FIGS. 3A, 3B, 3C and 3D illustrate block diagrams of example, non-limiting grouping processes that facilitate grouping of processing components in accordance with one or more embodiments described herein.

FIG. 4 illustrates another block diagram of an example, non-limiting grouping process that facilitates grouping of processing components in accordance with one or more embodiments described herein.

DETAILED DESCRIPTION

Figure 1:
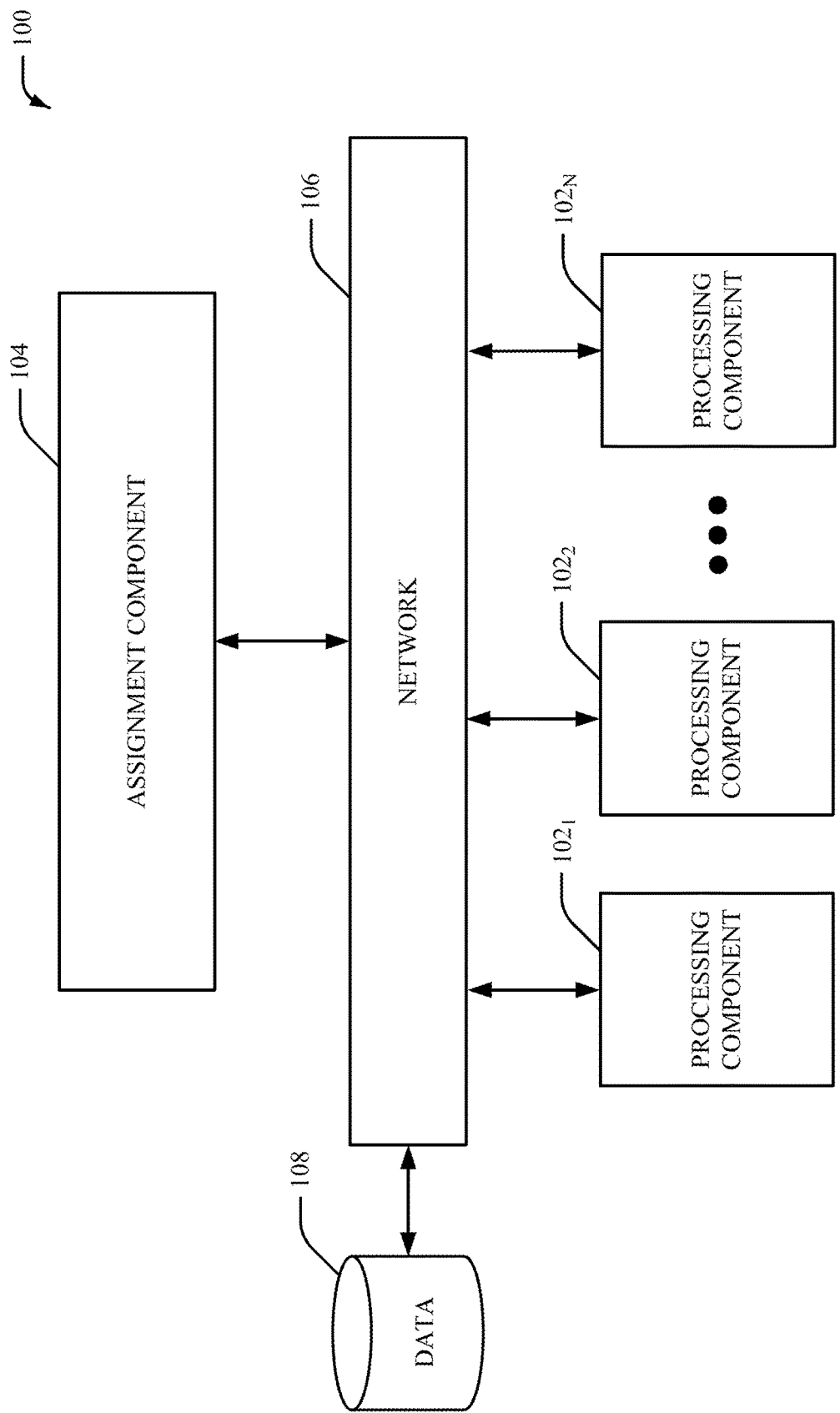
FIG. 1 illustrates a block diagram of an example, non-limiting system that facilitates deep learning in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Deep learning is a machine learning technique that employs a training process associated with a network of learner units (e.g., processing units) to determine previously unknown features, classifications and/or patterns associated with data provided to the network of learner units. Deep learning is often employed in technical fields such as, for example, speech recognition, image recognition, graphical modeling and bioinformatics. Data provided to the network of learner units can include a training set (e.g., a set of data with known classifications that is employed for the training process) that is employed at a beginning of the training process. Utilizing the training set, the network of learner units can perform iterative processing stages in which data generated during a particular processing stage is determined from data generated during one or more previous processing stages. During a processing stage, learner units can independently generate data based on input data and/or previously learned data and such information can be gathered by a centralized entity. However, a centralized approach for deep learning often suffers from communication delays, network bottlenecks and/or an imbalance in bandwidth utilization.

Embodiments described herein include techniques facilitating synchronization of processing components (e.g., processing engines) for parallel deep learning in distributed systems. For example, in one embodiment, processing components in a deep learning system (e.g., a machine learning system) can each receive a set of inputs and collectively generate an output based on the set of inputs. An output generated by a processing component can be provided to all other processing components in a designated group of processing components. In some embodiments, the processing components in a particular group can change from time to time during the deep learning process and based on any number of different factors. Accordingly, collaborative groups of processing components can be dynamically synchronized for parallel learning. In an aspect, model weights for a deep learning system can be communicated amongst a subset of processing components (e.g., a set of parallel processing components). One or more of the processing components can amalgamate the model weights to compute a composite model weight for the deep learning system. In some embodiments, communication between the one or more processing components can occur after the processing components in the subset complete a training process over a particular interval (e.g., over a defined mini-batch size, etc.). Learning associated with the deep learning process can occur by selecting different subsets of processing components at different times during the deep learning process. Additionally, in some embodiments, a processing component can independently update a model associated with the processing component based on learning performed by the processing component and/or other learning performed by at least one other processing component. In some embodiments, processing components in a deep learning system can therefore communicate and/or exchange data (e.g., updated information associated with a model, etc.) amongst the processing components to facilitate a deep learning process without a central entity (e.g., a parameter server that is implemented as a centralized storage entity and/or a centralized processing entity). For example, by employing groups of processing components that are dynamically assigned during various processing stages of a deep learning process, the deep learning process associated with the processing components can be performed without a centralized entity that gathers, stores and/or processes data generated by the processing components during various processing stages of the deep learning process. Moreover, in one or more embodiments, the likelihood of the occurrence of a bottleneck in the deep learning system can be reduced, communication time (e.g., communication delays) in the deep learning system can be reduced, processing time for the deep learning system (or components in the deep learning system) can be reduced, and/or bandwidth utilization for the deep learning system can be improved (e.g., balanced across links on a network of processing components).

FIG. 1 illustrates a block diagram of an example, non-limiting system that facilitates deep learning in accordance with one or more embodiments described herein. With reference now to FIG. 1, there is illustrated an example system 100 that can provide synchronization between processing components $102_{1-N}$ (e.g., processing engines) for parallel deep learning. In various embodiments, the system 100 can be a machine learning system and/or a deep learning system (e.g., the system 100 can facilitate deep learning). For example, the system 100 can perform a deep learning process (e.g., a deep learning training process) associated with a network of processing components $102_{1-N}$ that independently perform a set of machine learning techniques to achieve a common solution amongst the processing components $102_{1-N}$. In some embodiments, the system 100 can employ learning (e.g., machine learning) to determine features, classifications and/or patterns associated with data provided to the processing components $102_{1-N}$. The system 100 can be or be included in speech recognition systems, image recognition systems, graphical modeling systems, bioinformatics systems, data compression systems, artificial intelligence system, authentication systems, syntactic pattern recognition systems, medical systems, health monitoring systems or the like. Similarly, any of the processing components $102_{1-N}$ and/or the assignment component 104 can facilitate and/or be employed in such different types of systems.

In one example, the system 100 can be a neural network (e.g., an artificial neural network, a machine learning neural network, etc.) associated with interconnected deep learning that provides an estimated functional model from a set of unknown inputs. In another example, the system 100 can be associated with a Bayesian network that provides a graphical model that represents relationships between a set of variables (e.g., a set of random variables). In yet another example, the system 100 can be associated with a hidden Markov model that models data over a continuous time interval and/or outputs a probability distribution. However, the system 100 can alternatively be associated with a different machine learning system such as, but not limited to, a clustering machine learning system, a decision tree machine learning system, an instance-based machine learning system, a regression machine learning system, a regularization machine learning system, rule learning machine learning system, etc. Furthermore, it is to be appreciated that the system 100 can be any number of different types of machine learning systems to facilitate a deep learning process associated with a network of interconnected processing components.

The system 100 and/or the components of the system 100 can be employed to use hardware and/or software to solve problems that are highly technical in nature (e.g., related to bioinformatics, authentication, compression, etc.), that are not abstract and that cannot be performed as a set of mental acts by a human. Further, some of the processes performed may be performed by specialized computers for carrying out defined tasks related to the deep learning application/subject area. The system 100 and/or components of the system can be employed to solve new problems that arise through advancements in technology, computer networks, the Internet and the like. The system 100 can provide technical improvements to deep learning systems by improving processing efficiency among processing components in a deep learning system, reducing delay in processing performed by processing components in a deep learning system, avoiding or reducing the likelihood of network bottlenecks between processing components in a deep learning system, and/or improving bandwidth utilization for a network of processing components in a deep learning system, etc.

As shown in FIG. 1, the system 100 can include processing components $102_{1-N}$, wherein N can be an integer. For example, the system 100 can include two or more processing components $102_{1-N}$, wherein a total number of processing components can be varied based on design criteria of a particular implementation. Each of processing components $102_{1-N}$ (or, in some embodiments, one or more of the processing components $102_{1-N}$) can be or include a processing engine that processes data associated with a machine learning process (e.g., a deep learning process). For example, a processing component $102_{1-N}$ can perform a machine learning process that is also performed on one or more other processing component $102_{1-N}$. In another example, a processing component $102_{1-N}$ can perform a machine learning process that is different than another machine learning process performed on one or more other processing component $102_{1-N}$. A machine learning process associated with processing components $102_{1-N}$ can include, but is not limited to, a deep Boltzmann machine algorithm, a deep belief network algorithm, a convolution neural network algorithm, a stacked auto-encoder algorithm, etc. In certain embodiments, one or more of the processing components $102_{1-N}$ can be an artificial intelligence component. One or more of the processing components $102_{1-N}$ processing components $102_{1-N}$ can be similarly configured. However, in another implementation, at least one processing component from the processing components $102_{1-N}$ can be configured differently than another processing component from the processing components $102_{1-N}$.

A processing component can be associated with at least one processor (e.g., a central processing unit, a graphical processing unit, etc.). In various embodiments, the processing component can be or include hardware, software (e.g., a set of threads, a set of processes, software in execution, etc.) or a combination of hardware and software that performs a computing task for machine learning a machine learning computing task associated with received data). For example, the processing components $102_{1-N}$ can execute deep processing threads that cannot be performed by a human (e.g., are greater than the capability of a single human mind). For example, the amount of data processed, the speed of processing of the data and/or the data types processed by processing components $102_{1-N}$ over a certain period of time can be respectively greater, faster and different than the amount, speed and data type that can be processed by a single human mind over the same period of time. For example, data processed by processing components $102_{1-N}$ can be raw data (e.g., raw audio data, raw video data, raw textual data, raw numerical data, etc.) and/or compressed data (e.g., compressed audio data, compressed video data, compressed textual data, compressed numerical data, etc.) captured by one or more sensors and/or one or more computing devices. Moreover, processing components $102_{1-N}$ can be fully operational towards performing one or more other functions (e.g., fully powered on, fully executed, etc.) while also processing the above-referenced deep learning data.

In an aspect, each of processing components $102_{1-N}$ can be associated with, comprise and/or be operatively coupled to a computing device (e.g., a computing device associated with one or more processors). For example, first processing component $102_1$ can be implemented on a first computing device, second processing component $102_2$ can be implemented on the first computing device or a second computing device, third processing component $102_3$ can be implemented on the first computing device, the second computing device or a third computing device, etc. In an implementation, more than one processing component $102_{1-N}$ can be implemented on a computing device. For example, first processing component $102_1$ and second processing component $102_2$ can be implemented on a first computing device, third processing component $102_3$ can be implemented on a third computing device, etc.

One or more of the processing components $102_{1-N}$ can be communicatively coupled to an assignment component 104 via a network 106. Furthermore, each of processing components $102_{1-N}$ (or, in some embodiments, one or more processing components $102_{1-N}$) can receive at least a portion of data 108 via the network 106. In an example, the processing component $102_1$ can receive a first portion of the data 108 (e.g., a first set of inputs associated with the data 108), the processing component $102_2$ can receive a second portion of the data 108 that is different than the first portion of the data 108 (e.g., a second set of inputs associated with the data 108), etc. The data 108 can be raw, compressed and/or processed data and can include, but is not limited to, any number of different types of data such as audio data, video data, textual data and/or numerical data. In different embodiments, the sizes of the respective portions of data 108 received by different ones of processing components $102_{1-N}$ can be the same or different from time to time.

In an aspect, the data 108 can be stored in a database to which the processing components $102_{1-N}$ and/or the assignment component 104 are communicatively coupled via the network 106. Therefore, in some embodiments, the processing components $102_{1-N}$ can receive the data 108 from a remote location via the network 106. The network 106 can include or be various wired network(s) and/or wireless network(s), including, but not limited to, local area networks (LANs), wide area networks (WANs) such as the Internet and/or networks that provide interconnections for devices associated with a defined workspace.

In some embodiments, the processing components $102_{1-N}$ can generate a common model (e.g., a common deep learning model) based on the data 108. The data 108 can be, for example, training data (e.g., a training set) employed for a training process associated with performing deep learning. For example, the data 108 can be a set of inputs for output data (e.g., a machine learning model, a neural network model, etc.) generated by the processing components $102_{1-N}$.

The assignment component 104 can be associated with, comprise and/or be operatively coupled to at least one processor. In one aspect, the assignment component 104 can be implemented on a processor that is different than a processor that includes one or more of processing components $102_{1-N}$. In some embodiments, the assignment component 104 can be associated with a server device (not shown) (e.g., the assignment component 104 can be implemented on a server device). The assignment component 104 can be or include hardware, software (e.g., a set of threads, a set of processes, software in execution, etc.) or a combination of hardware and software.

The processing components $102_{1-N}$ can perform a deep learning process associated with the data 108. For example, the processing components $102_{1-N}$ can collectively determine output data based on the data 108. The processing components $102_{1-N}$ can, for example, collectively train a model for a deep learning process based on the data 108. The processing components $102_{1-N}$ can also generate respective models (e.g., a current models) for each iteration of a deep learning process. The respective models (e.g., the current models) can represent a current state of a neural network associated with the processing components $102_{1-N}$. In another example, the processing components $102_{1-N}$ can collectively determine a solution for a task associated with the data 108. In yet another example, the processing components $102_{1-N}$ can collectively determine features, classifications and/or patterns associated with the data 108. In yet another example, the processing components $102_{1-N}$ can collectively perform a set of processing acts and/or a deep learning process associated with the data 108.

In various embodiments, one or more (or, in some embodiments, each) of the processing components $102_{1-N}$ can generate output data based on one or more defined processes (e.g., one or more defined machine learning processes, one or more defined deep learning processes, one or more defined neural network processes, etc.). Output data generated by the processing components $102_{1-N}$ can be stored locally at the processing components $102_{1-N}$ (e.g., output data generated by the processing components $102_{1-N}$ can be stored in at least one memory associated with or comprised within the processing components $102_{1-N}$). Additionally or alternatively, the output data can include a set of model parameters, a set of model weights for a model (e.g., a neural network model) associated with the data 108 and/or a set of gradients. For example, the output data can be a set of parameters (e.g. a set of model parameters) associated with model data (e.g., a machine learning model, a neural network model, etc.). Additionally or alternatively, the output data can be a set of model weights associated with model data (e.g., a machine learning model, a neural network model, etc.). Additionally or alternatively, the output data can be a set of gradients associated with model data (e.g., a machine learning model, a neural network model, etc.).

During a first act for a deep learning process, the processing components can generate respective output data based on processing the respective portions of the data 108 received by the processing components. After performing the first act for the deep learning process, one or more of the (or, in some embodiments, each of the) processing components $102_{1-N}$ can store respective output data in one or more respective memories operatively coupled to the processing components $102_{1-N}$. In an example, the processing component $102_1$ can generate output data based on the first portion of the data 108 (e.g., during the first act for the deep learning process), the processing component $102_2$ can generate output data based on the second portion of the data 108 (e.g., during the first act for the deep learning process), etc. As such, in some embodiments, the processing components $102_{1-N}$ can store output data generated in response to the data 108 rather than storage of the output data at a centralized entity (for example, at the assignment component 104).

The combination of the processing components $102_{1-N}$ and the assignment component 104 is non-obvious since the assignment component 104 performs novel dynamic grouping of the processing components $102_{1-N}$ during a deep learning process. During a deep learning process associated with the processing components $102_{1-N}$, the assignment component 104 can repeatedly assign processing components $102_{1-N}$ to groups based on processing of the data received by the processing components $102_{1-N}$. For example, the assignment component 104 can determine a group of processing components from the processing components $102_{1-N}$ based on defined criterion associated with the processing components $102_{1-N}$, the data 108, and/or other data associated with the processing components $102_{1-N}$. Furthermore, the assignment component 104 can determine a group of processing components from the processing components $102_{1-N}$ multiple times during a deep learning process associated with the data 108. In an aspect, the assignment component 104 can determine a group of processing components from the processing components $102_{1-N}$ based on processing of data by the processing components $102_{1-N}$. For example, the assignment component 104 can determine a group of processing components from the processing components $102_{1-N}$ based on processing time of data (e.g., a finishing time for processing data, an interval for processing the data, an amount of time for processing the data, etc.) by the processing components $102_{1-N}$. The assignment component 104 can determine a group of processing components from the processing components $102_{1-N}$, in one example, based on a training process (e.g., a deep learning process, a mini-batch training process, etc.) associated with the data 108. For example, the assignment component 104 can determine a group of processing components from the processing components $102_{1-N}$ based on a rate (e.g., a processing speed) in which training data is processed by processing components $102_{1-N}$.

In a non-limiting example, the assignment component 104 can assign the processing component $102_1$ and the processing component $102_3$ to a particular group in response to a determination that the processing component $102_1$ is or will be the first processing component to finish processing the data 108, and that the processing component $102_3$ is or will be the next processing component to finish processing the data 108. As such, the assignment component 104 can employ a first-come first-served scheme to assign processing components $102_{1-N}$ to groups. In another aspect, the assignment component 104 can maintain a defined list of groups for the processing components $102_{1-N}$ before the processing components $102_{1-N}$ receive the data 108. As such, in this example, the assignment component 104 can concurrently (or in parallel) assign groups within the set of processing components $102_{1-N}$.

In yet another aspect, the assignment component 104 can form a group of processing components from the processing components $102_{1-N}$ based on a location (e.g., a locality) of a particular processing component with respect to other processing components $102_{1-N}$ in the system 100. A location of the processing component can be indicated, for example, based on an identity of a particular processor in which the processing component resides. For example, processing components $102_{1-N}$ can be stored on multiple processors. Therefore, the assignment component 104 can store a list of defined processors in the system 100 and/or a subset of processing components $102_{1-N}$ that are stored on the defined processors. In a non-limiting example, the assignment component 104 can assign the processing component $102_1$ and the processing component $102_3$ to the same group in response to a determination that the processing component $102_1$ and the processing component $102_3$ are implemented on a common computing device (e.g., a common processor or a common set of processors). The one or more defined criteria (which can be the same as or different from one another) employed by the assignment component 104 to form groups of processing components $102_{1-N}$ can vary during the deep learning process associated with the processing components $102_{1-N}$.

The assignment component 104 can repeatedly form groups within the processing components $102_{1-N}$ until a defined criterion associated with the data 108 and/or the processing components $102_{1-N}$ is satisfied. By way of example, but not limitation, the defined criterion can be a number of groups formed by the assignment component 104 reaching a defined value or an error value (e.g., a training error value, etc.) associated with the data 108 reaching a defined value. Accordingly, collaborative groups of processing components can be dynamically synchronized by the assignment component 104 for parallel learning during a deep learning process.

In some embodiments, the assignment component 104 can manage assignment of processing components $102_{1-N}$ to groups without storing and/or processing output data generated by processing components $102_{1-N}$ (e.g., without storing and/or processing output data generated by processing components $102_{1-N}$). As such, the assignment component 104 can be configured as an arbiter rather than a parameter server device (e.g., a centralized mechanism that collects, stores and/or processes output data generated by processing components, a centralized mechanism that transmits new data to processing components to guide a direction of a task being performed by processing components, etc.).

Groups determined by the assignment component 104 can comprise different subsets of the processing components $102_{1-N}$. In various embodiments, groups determined by the assignment component 104 can comprise different numbers of processing components $102_{1-N}$. In some embodiments, the processing components in different groups can be mutually exclusive while, in other embodiments, one or more processing components assigned to a first group can also be assigned to a second group. In an aspect, during a first act for a deep learning process, the assignment component 104 can assign two or more processing components $102_{1-N}$ to a group based on processing of the data 108 by the particular processing components. Output data generated by one or more (or, in some embodiments, each) of processing components $102_{1-N}$ in the group can be exchanged with other processing components $102_{1-N}$ in the group. Processing components in the group can communicate with one another via the network 106 and/or via one or more direct communication channels between the processing components. Any number of different communication protocols can be employed.

Additionally, processing components in a group can iteratively generate other output data based on data received from at least one other processing component in the group. The other output data can include further processed data, for example (e.g., further processed audio, video, textual and/or numerical data; further updated model parameter, model weights and/or gradients). One or more of the processing components $102_{1-N}$ can generate the other output data during one or more subsequent acts for the deep learning process (e.g., during one or more acts after the first act for the deep learning process).

A subsequent act for the deep learning process can be a subsequent processing act that is performed by a processing components $102_{1-N}$ after a first process act associated with the data 108. For example, processing component $102_1$ can generate other output data based on the first portion of the data 108 and/or data received from at least one other processing component (e.g., during a subsequent act for the deep learning process), processing component $102_2$ can generate other output data based on the second portion of the data 108 and/or data received from at least one other processing component (e.g., during the subsequent act for the deep learning process), etc. The processing component $102_1$ can generate updated output data (e.g., new output data) based on the data 108 (e.g. a first portion of the data 108) and/or the other output data generated by the processing component $102_2$. The updated output data can be an updated version of the output data that is stored in the memory operatively coupled to the processing component $102_1$.

In response to determination of a second group by the assignment component 104, the processing component $102_1$ and the processing component $102_3$ can exchange data. For example, the processing component $102_1$ can transmit the updated output data to the processing component $102_3$. Furthermore, the processing component $102_3$ can transmit the data (e.g., communication data) to processing component $102_1$. The processing component $102_1$ can then perform further processing based on the other data generated by the processing component $102_3$. For example, the processing component $102_1$ can generate updated output data (e.g., new output data) based on at least a portion of the data 108, data stored in the memory operatively coupled to the processing component $102_1$ and/or the data generated by the processing component $102_3$. The updated output data can be an updated version of the output data that is stored in the memory operatively coupled to the processing component $102_1$.

Then, the assignment component 104 can assign at least the processing component $102_1$ and another processing component from the processing components $102_{1-N}$ to a third group based on a defined criterion. The defined criterion associated with the third group can correspond to the defined criterion associated with the first group and/or the second group. Alternatively, the defined criterion associated with the third group can be different than (e.g., distinct from) the defined criterion associated with the first group and/or the second group. The defined criterion can be associated with the data 108, the updated output data generated by the processing component $102_1$, the processing component $102_1$ and/or the other processing component from the processing components $102_{1-N}$. In response to formation of the third group by the assignment component 104, the processing component $102_1$ and the other processing component from the processing components $102_{1-N}$ can exchange data, etc. The assignment component 104 can continue forming a group for the processing component $102_1$ until it is determined that a deep learning process associated with the data 108 is complete. As such, the assignment component 104 can repeatedly change a group to which a processing component $102_{1-N}$ belongs during processing of the data 108 (e.g., during a deep learning process associated with the data 108).

Processing performance (e.g., processing power, maximum central processing unit (CPU) cycles, processing speed, relative efficiency, throughput, etc.) of a processor that includes the assignment component 104 and/or the processing components $102_{1-N}$ can be improved employing one or more of the embodiments described herein.

FIG. 2 illustrates another block diagram of an example, non-limiting system 200 that facilitates deep learning in accordance with one or more embodiments described herein. Repetitive description of like elements employed in other embodiments described herein is omitted for sake of brevity.

In the embodiment shown in FIG. 2, the assignment component 104 can be implemented on at least one of the processing components $102_{1-N}$. For example, the assignment component 104 can be implemented on at least the first processing component $102_1$. As such, the first processing component $102_1$ that can also include the assignment component 104 can receive at least a portion of the data 108 via the network 106, generate output data based on the data 108, exchange data with one or more other processing components from the processing components $102_{2-N}$, etc., as more fully described herein. Furthermore, the assignment component 104 included in the first processing component $102_1$ can assign two or more processing components $102_{1-N}$ to a group, as more fully disclosed herein. As such, since the embodiment of FIG. 2 indicates the first processing component $102_1$ having the functionality of the assignment component 104, and such can be provided for any number of the processing components $102_{1-N}$, in some embodiments, formation of groups associated with the processing components $102_{1-N}$ can be determined autonomously among the processing components $102_{1-N}$ (e.g., without a separate assignment component in communication with the processing components $102_{1-N}$ via the network 106, as shown and described with reference to FIG. 1).

Combining the assignment component 104 with at least one of the processing components $102_{1-N}$ is non-obvious since the assignment component 104 performs novel dynamic grouping of the processing components $102_{1-N}$ and this embodiment allows autonomous grouping of the processing component $102_{1-N}$. In an aspect, the assignment component 104 (e.g., the assignment component 104 included in the first processing component $102_1$) can assign two or more processing components $102_{1-N}$ to a group based on processing of the data 108 by the processing components $102_{1-N}$. For example, the assignment component 104 can assign two or more processing components $102_{1-N}$ to a group based on processing time of data (e.g., the time duration for one or more processing components to complete processing of data). In another aspect, the assignment component 104 (e.g., the assignment component 104 included in the first processing component $102_1$) can randomly assign the processing components to one or more groups. In yet another aspect, the assignment component 104 (e.g., the assignment component 104 included in the first processing component $102_1$) can assign two or more processing components $102_{1-N}$ to a group based on a defined list of processing components. For example, two or more processing component $102_{1-N}$ can be assigned to groups before processing of data 108 begins. In yet another aspect, the assignment component 104 (e.g., the assignment component 104 included in the first processing component $102_1$) can assign two or more processing components $102_{1-N}$ to a group based on a location of the two or more processing components with respect to other processing components. For example, the two or more processing components assigned to the same group can be implemented on a common computing device and/or implemented by a common set of processors.

FIGS. 3A, 3B, 3C and 3D illustrate block diagrams of example, non-limiting grouping processes that facilitate grouping of processing components in accordance with one or more embodiments described herein. Repetitive description of like elements employed in other embodiments described herein is omitted for sake of brevity.

One or more of the processing components $102_{1-5}$ can receive portions of the data 108 (e.g., the portions of the data 108 can be the same or different in size and/or content) via the network 106 during a deep learning process associated with the data 108. For example, the processing component $102_1$ can receive a first portion of the data 108, the processing component $102_2$ can receive a second portion of the data 108, the processing component $102_3$ can receive a third portion of the data 108, the processing component $102_4$ can receive a fourth portion of the data 108, and the processing component $102_5$ can receive a fifth portion of the data 108. Furthermore, in an example, the first portion can be a first mini-batch associated with the data 108, the second portion can be a second mini-batch associated with the data 108, the third portion can be a third mini-batch associated with the data 108, the fourth portion can be a fourth mini-batch associated with the data 108, and the fifth portion can be a fifth mini-batch associated with the data 108. One or more of (or, in some embodiments, each of) the processing components $102_{1-5}$ can process respective portions of the data 108 during a first act for a deep learning process associated with the data 108.

Although not shown, the system 300 can also include the assignment component 104 described and shown with reference to FIGS. 1 and/or 2. In some embodiments, the assignment component 104 can assign the processing components $102_{1-5}$ to one or more groups after each processing act for the deep learning process. As such, during the deep learning process associated with the data 108, the assignment component 104 can repeatedly assign the processing components $102_{1-5}$ to different groups. Assignment of the groups by the assignment component 104 can facilitate improved execution time for the deep learning process and/or can facilitate reduced communication time among the processing components $102_{1-5}$ during the deep learning process.

As illustrated in FIG. 3A, in response to a determination by the assignment component 104 that a first criterion associated with the processing component $102_2$ is satisfied at time A and a second criterion associated with the processing component $102_3$ is satisfied at time B, a first group 302 can be formed that includes the processing component $102_2$ and the processing component $102_3$. In a non-limiting example, the first criterion can be that the processing component $102_2$ has finished processing the second portion of the data 108 and/or has completed a first act for processing the second portion of the data 108. Similarly, the second criterion can be that the processing component $102_3$ has finished processing the third portion of the data 108 and/or has completed a first act for processing the third portion of the data 108. Thus, the first two processing components to finish processing their respective portions of data 108 can be grouped together in some embodiments. Additionally or alternatively, the first criterion and/or the second criterion can be associated with a processor location of the processing component $102_2$ with respect to the processing component $102_3$, associated with defined data (e.g., a defined group list) for the processing component $102_2$ and the processing component $102_3$ that is determined prior to processing of the data 108 by the processing component $102_2$ and the processing component $102_3$ or based on any number of factors.

After formation of the first group 302, the processing component $102_2$ and the processing component $102_3$ can exchange respective output data generated. For example, the processing component $102_2$ can receive output data generated by the processing component $102_3$ and the processing component $102_3$ can receive output data generated by the processing component $102_2$. In one embodiment, the output data generated by the processing component $102_2$ and/or the processing component $102_3$ can be stored by the processing component $102_2$ and/or the processing component $102_3$, respectively. The processing components $102_{2,3}$ can continue deep learning processes associated with the data 108 based on the output data received from the other of the processing components $102_{3,2}$ without providing output data to the assignment component 104 (e.g., the assignment component 104 does not receive and/or process output data generated by the processing component $102_2$ and/or the processing component $102_3$) and/or without receiving processed data associated with the data 108 from the assignment component 104.

Figure 3B:
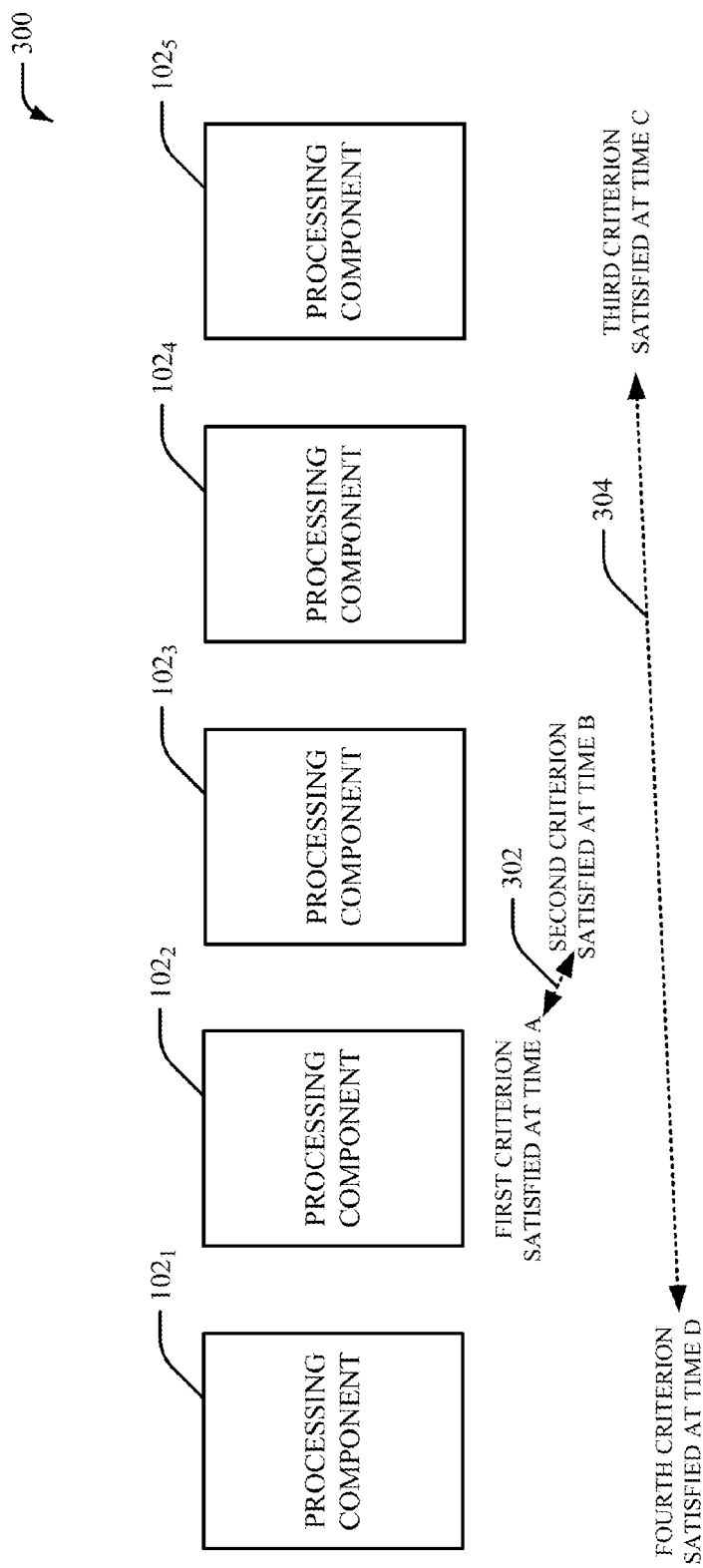

As illustrated in FIG. 3B, in response to a determination by the assignment component 104 that a third criterion associated with the processing component $102_5$ is satisfied at time C and a fourth criterion associated with the processing component $102_1$ is satisfied at time D, a second group 304 can be formed that includes the processing component $102_1$ and the processing component $102_5$. In a non-limiting example, the third criterion can be that the processing component $102_5$ has finished processing the fifth portion of the data 108 and/or has completed a first act for processing the fifth portion of the data 108. Similarly, the fourth criterion can be that the processing component $102_1$ has finished processing the first portion of the data 108 and/or has completed a first act for processing the first portion of the data 108. Any number of criteria for grouping can be employed, as previously described. $102_1$.

After formation of the second group 304, the processing component $102_1$ and the processing component $102_5$ can exchange output data generated based on the data 108. For example, the processing component $102_1$ can receive output data from the processing component $102_5$ that is generated based on the data 108. Furthermore, the processing component $102_5$ can receive other output data from the processing component $102_1$ that is generated based on the data 108. In an aspect, output data generated by the processing component $102_5$ and/or the processing component $102_1$ can be stored by the processing component $102_5$ and/or the processing component $102_1$. The processing component $102_1$ can continue a deep learning process associated with the data 108 based on the output data received from the processing component $102_5$. Similarly, the processing component $102_5$ can continue a deep learning process associated with the data 108 based on the other output data received from the processing component $102_1$. As such, the processing component $102_5$ and the processing component $102_1$ can continue the deep learning process without providing output data to the assignment component 104 (e.g., the assignment component 104 does not receive and/or process output data generated by the processing component $102_5$ and/or the processing component $102_1$) and/or without receiving processed data associated with the data 108 from the assignment component 104.

Figure 3C:
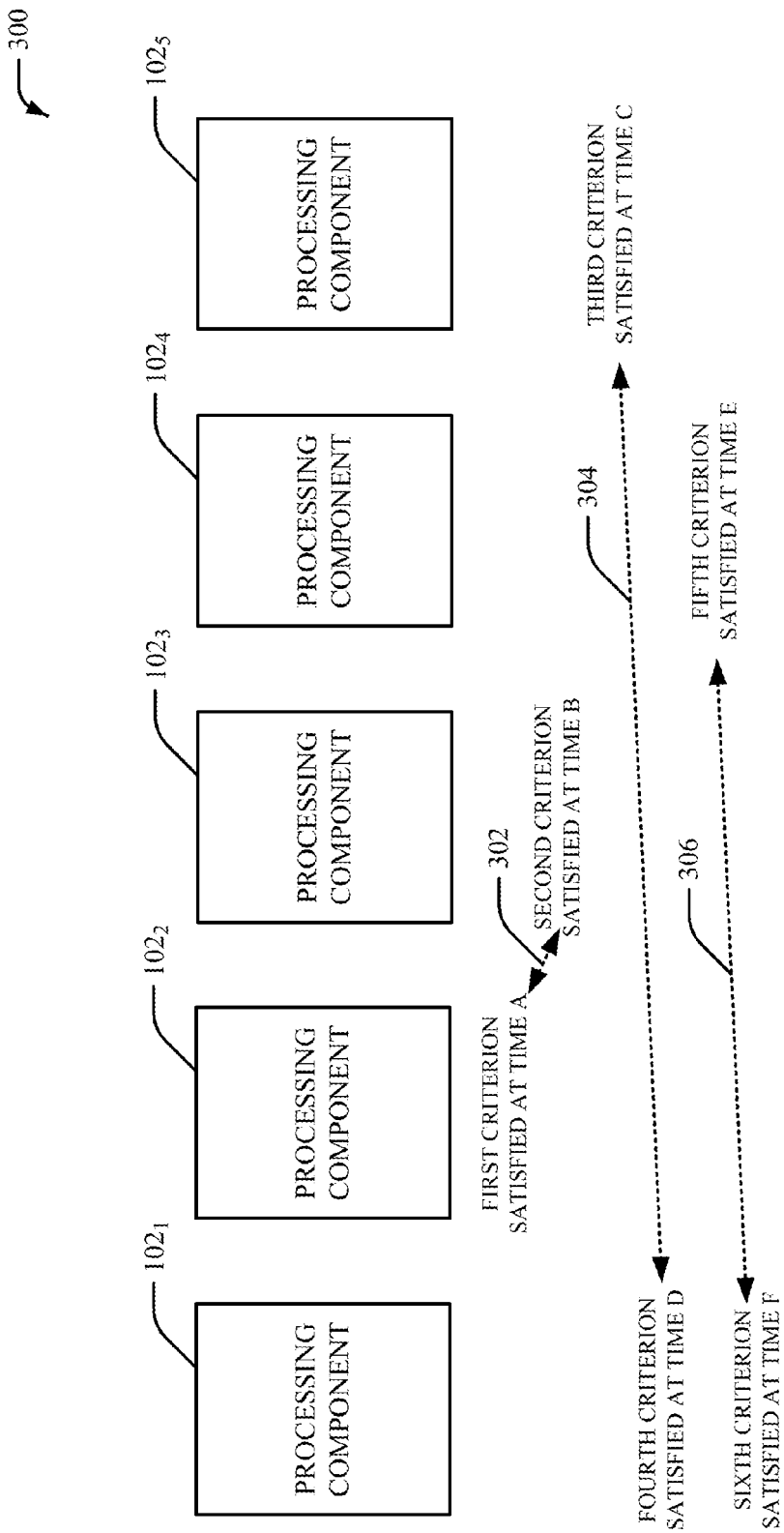

As illustrated in FIG. 3C, in response to a determination by the assignment component 104 that a fifth criterion associated with the processing component $102_4$ is satisfied at time E and a sixth criterion associated with the processing component $102_1$ is satisfied at time F, a third group 306 is formed that can also include the processing component $102_1$ and the processing component $102_4$. In a non-limiting example, the fifth criterion can be that the processing component $102_4$ has finished processing the fourth portion of the data 108 and/or has completed a first act for processing the fourth portion of the data 108. The sixth criterion can be that the processing component $102_1$ has finished further processing the first portion of the data 108 and/or has completed a second act for processing the first portion of the data 108. Additionally or alternatively, the fifth criterion and/or the sixth criterion can be associated with a processor location of the processing component $102_4$ with respect to the processing component $102_1$. Additionally or alternatively, the fifth criterion and/or the sixth criterion can be associated with defined data (e.g., a defined group list) for the processing component $102_4$ and the processing component $102_1$ that is determined prior to processing of the data 108 by the processing component $102_4$ and the processing component $102_1$. The third group 306 can be determined by the assignment component 104. After formation of the third group 306, the processing component $102_1$ and the processing component $102_4$ can exchange output data associated with the data 108. For example, the processing component $102_1$ can receive output data from the processing component $102_4$ that is generated based on the data 108. Furthermore, the processing component $102_4$ can receive other output data from the processing component $102_1$ that is associated with the data 108 and/or output data generated by the processing component $102_5$. In an aspect, output data generated by the processing component $102_4$ and/or the processing component $102_1$ can be stored by the processing component $102_4$ and/or the processing component $102_1$. The processing component $102_1$ can continue a deep learning process associated with the data 108 based on the output data received from the processing component $102_4$. Similarly, the processing component $102_4$ can continue a deep learning process associated with the data 108 based on the other output data received from the processing component $102_1$. As such, the processing component $102_4$ and the processing component $102_1$ can continue the deep learning process without providing output data to the assignment component 104 (e.g., the assignment component 104 does not receive and/or process output data generated by the processing component $102_4$ and/or the processing component $102_1$) and/or without receiving processed data associated with the data 108 from the assignment component 104.

Figure 3D:
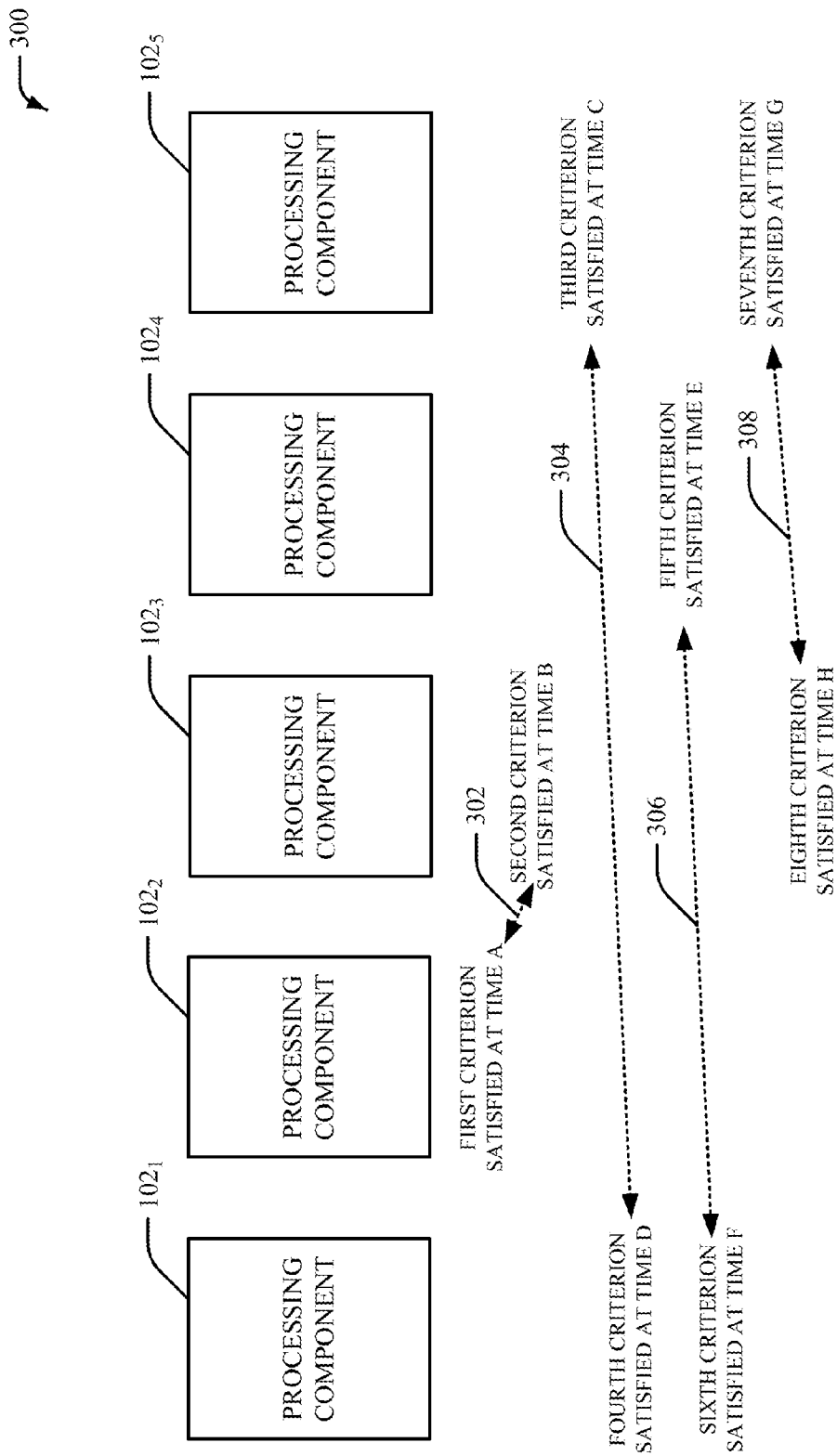

As illustrated in FIG. 3D, in response to a determination by the assignment component 104 that a seventh criterion associated with the processing component $102_5$ is satisfied at time G and an eighth criterion associated with the processing component $102_3$ is satisfied at time H, a fourth group 308 is formed that can also include the processing component $102_3$ and the processing component $102_5$. In a non-limiting example, the seventh criterion can be that the processing component $102_5$ has finished further processing the fifth portion of the data 108 and/or has completed a second act for processing the fifth portion of the data 108. The eighth criterion can be that the processing component $102_3$ has finished further processing the third portion of the data 108 and/or has completed a second act for processing the third portion of the data 108. Additionally or alternatively, the seventh criterion and/or the eighth criterion can be associated with a processor location of the processing component $102_5$ with respect to the processing component $102_3$. Additionally or alternatively, the seventh criterion and/or the eighth criterion can be associated with defined data (e.g., a defined group list) for the processing component $102_5$ and the processing component $102_3$ that is determined prior to processing of the data 108 by the processing component $102_5$ and the processing component $102_3$. The fourth group 308 can be determined by the assignment component 104. After formation of the fourth group 308, the processing component $102_3$ and the processing component $102_5$ can exchange output data generated based on the data 108. For example, the processing component $102_3$ can receive output data from the processing component $102_5$ that is associated with the data 108 and/or output data generated by the processing component $102_1$. Furthermore, the processing component $102_5$ can receive other output data from the processing component $102_3$ that is associated with the data 108 and/or output data generated by the processing component $102_2$. In an aspect, output data generated by the processing component $102_5$ and/or the processing component $102_3$ can be stored by the processing component $102_5$ and/or the processing component $102_3$. The processing component $102_3$ can continue a deep learning process associated with the data 108 based on the output data received from the processing component $102_5$. Similarly, the processing component $102_5$ can continue a deep learning process associated with the data 108 based on the other output data received from the processing component $102_3$. As such, the processing component $102_5$ and the processing component $102_3$ can continue the deep learning process without providing output data to the assignment component 104 (e.g., the assignment component 104 does not receive and/or process output data generated by the processing component $102_5$ and/or the processing component $102_3$) and/or without receiving processed data associated with the data 108 from the assignment component 104. Moreover in some embodiments, the processing components $102_{1-5}$ can independently perform the deep learning process for the data 108 in synchronization and/or in parallel, as illustrated in FIGS. 3A-D, without providing data to a centralized entity (e.g., without providing data to the assignment component 104) during the deep learning process. It is to be appreciated that different numbers of groups can be formed during a deep learning process and/or that different number of processing components can be included in the groups (some groups may have a first number of processing components while other groups have a second number of processing components, for example). In an embodiment, during a last operation for a deep learning process that is performed by the processing components $102_{1-5}$, the assignment component 104 can assign the processing components $102_{1-5}$ to a single group so that a single model is output by the processing components $102_{1-5}$ (e.g., a single model is output for a training process associated with the processing components $102_{1-5}$).

FIG. 4 illustrates another block diagram of an example, non-limiting grouping process that facilitates grouping of processing components in accordance with one or more embodiments described herein. Repetitive description of like elements employed in other embodiments described herein is omitted for sake of brevity.

As shown, the system 400 can include a first group 402 and a second group 404. The first group 402 can be associated with an act (e.g., cycle or iteration of processing) during a deep learning process. The second group 404 can be associated with another act (e.g., cycle or iteration of processing) during the deep learning process (e.g., another act that is different than the act associated with the first group 402). Furthermore, the first group 402 and the second group 404 can be determined by the assignment component 104 described with reference to FIGS. 1 and/or 2. As illustrated in FIG. 4, the first group 402 can also include at least one different processing component than the second group 404.

For example, the first group 402 can include processing component $102_1$, processing component $102_3$ and processing component $102_5$, and the second group 404 can include processing component $102_1$, processing component $102_4$ and processing component $102_5$. As such, during a deep learning act, at least processing component $102_1$, processing component $102_3$ and processing component $102_5$ can exchange data to facilitate collective generation of predicted output data associated with deep learning. Furthermore, during another deep learning act, at least processing component $102_1$, processing component $102_4$ and processing component $102_5$ can exchange data to further facilitate collective generation of predicted output data associated with deep learning.

From the perspective of processing component $102_1$ illustrated in FIG. 4, a group to which processing component $102_1$ belongs can repeatedly change during each processing act (e.g., each processing cycle or iteration) for a deep learning process. Similarly, from the perspective of processing component $102_5$ illustrated in FIG. 4, a group to which processing component $102_5$ belongs can also repeatedly change during each processing act (e.g., each processing cycle), or during one or more processing acts, for a deep learning process. For example, processing component $102_3$ is included in the first group 402, which also includes processing component $102_1$ and processing component $102_5$. However, processing component $102_3$ is not included in the second group 404, which includes processing component $102_1$ and processing component $102_5$. Furthermore, processing component $102_4$ is not included in the first group 402, which includes processing component $102_1$ and processing component $102_5$. However, processing component $102_4$ is included in the second group 404, which includes processing component $102_1$ and processing component $102_5$. Moreover, in some embodiments, data generated by the first group 402 and the second group 404 is not provided to a centralized entity (e.g., the assignment component 104) during the deep learning process. In an implementation, the processing component $102_3$, which is not included in the second group 404 can be further assigned to a third group, which also includes at least one processing component that is not included in the first group 402.

Figure 5:
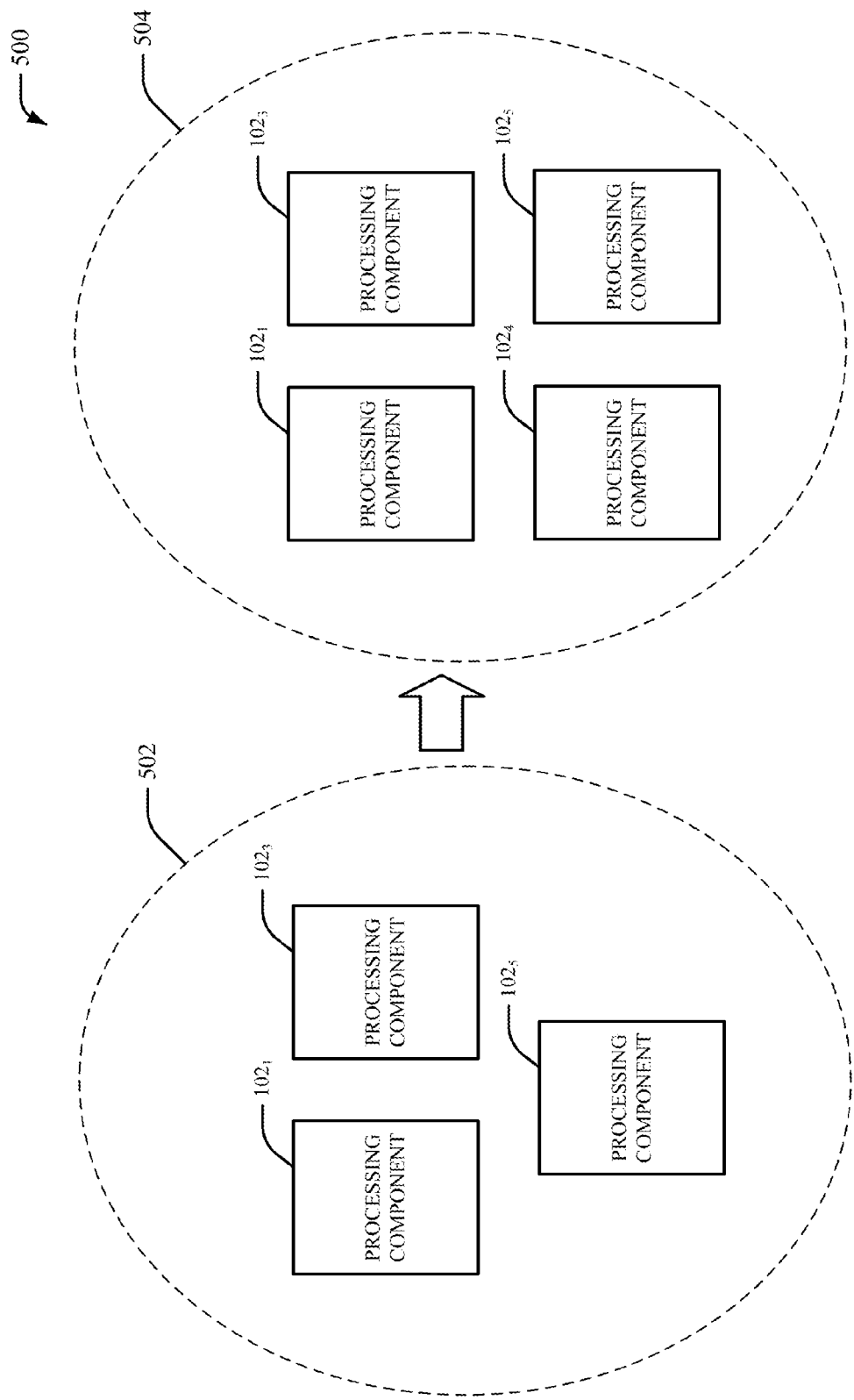
FIG. 5 illustrates yet another block diagram of an example, non-limiting grouping process that facilitates grouping of processing components in accordance with one or more embodiments described herein.

FIG. 5 illustrates yet another block diagram of an example, non-limiting grouping process that facilitates grouping of processing components in accordance with one or more embodiments described herein. Repetitive description of like elements employed in other embodiments described herein is omitted for sake of brevity.

As shown, the system 500 can include a first group 502 and a second group 504. The first group 502 can be associated with an act during a deep learning process. The second group 504 can be associated with another act during a deep learning process (e.g., another act that is different than the act associated with the first group 502). Furthermore, the first group 502 and the second group 504 can be determined by the assignment component 104. As illustrated in FIG. 5, the first group 502 can also include a different number of processing components than the second group 504. For example, the first group 502 can include processing component $102_1$, processing component $102_3$ and processing component $102_5$. Furthermore, the second group 504 can include processing component $102_1$, processing component $102_3$, processing component $102_4$ and processing component $102_5$. As such, during a deep learning act, at least processing component $102_1$, processing component $102_3$ and processing component $102_5$ can exchange data to facilitate collective generation of predicted output associated with deep learning. Furthermore, during another deep learning act, at least processing component $102_1$, processing component $102_3$, processing component $102_4$ and processing component $102_5$ can exchange data to further facilitate collective generation of predicted output associated with deep learning. Therefore, from the perspective of processing component $102_1$ illustrated in FIG. 5, a size of a group of processing components to which processing component $102_1$ belongs (e.g., a number of processing components in a group) can change during a deep learning process. Moreover, data generated by the first group 502 and the second group 504 is not provided to a centralized entity (e.g., the assignment component 104) during the deep learning process. It is to be appreciated that in certain implementations, a group (e.g., the second group 504) determined by the assignment component 104 can include less processing components than another group (e.g., the first group 502) determined by the assignment component 104.

Figure 6:
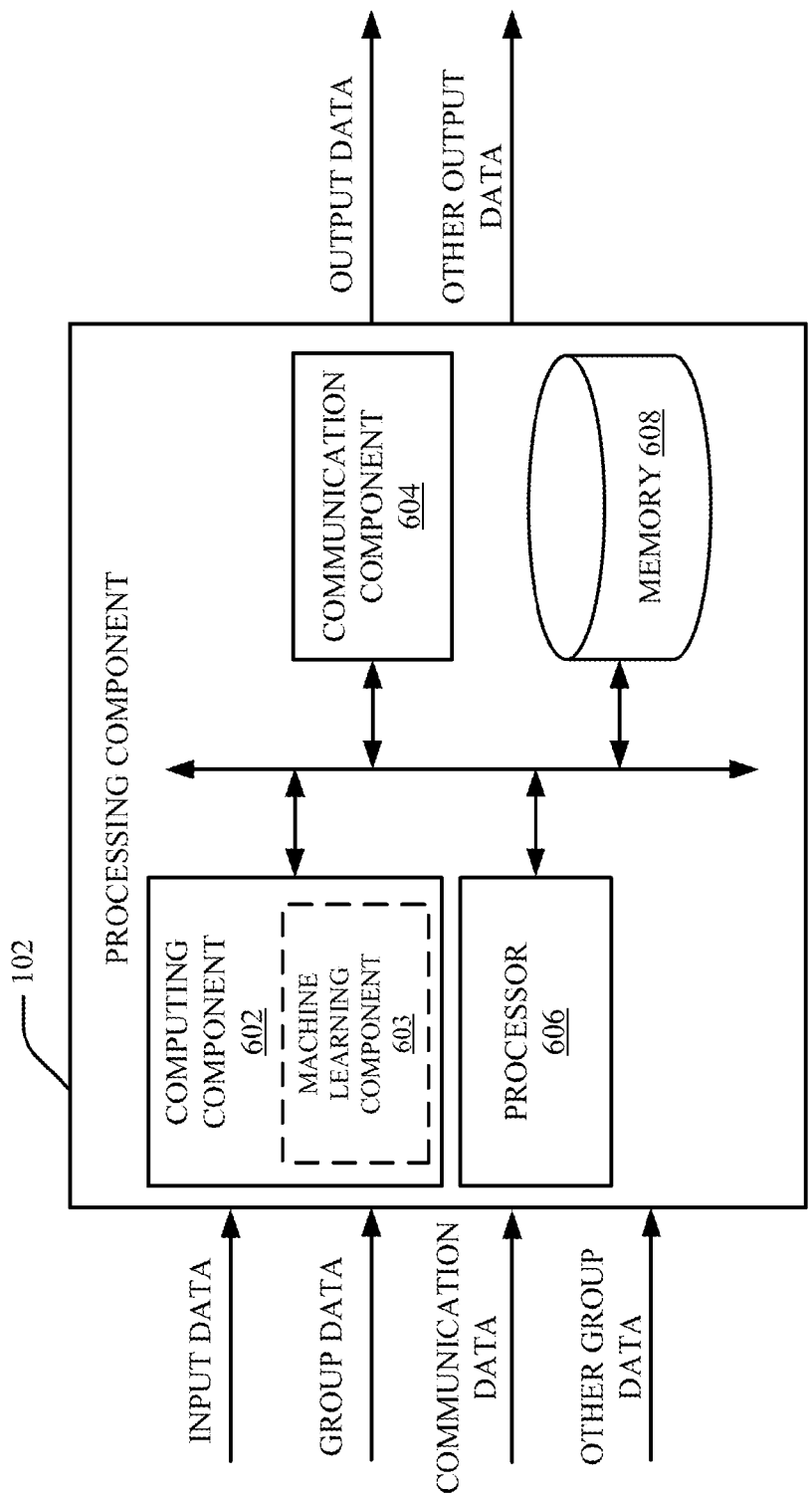
FIG. 6 illustrates a high-level block diagram of an example, non-limiting processing component in accordance with one or more embodiments described herein.

FIG. 6 illustrates a high-level block diagram of an example, non-limiting processing component 102 in accordance with one or more embodiments described herein. Repetitive description of like elements employed in other embodiments described herein is omitted for sake of brevity.

The processing component 102 can correspond to a processing component from processing components $102_{1-N}$ (e.g., the processing component 102 can correspond to first processing components $102_1$). As shown in FIG. 6, the processing component 102 can also include a computing component 602 and a communication component 604. Aspects of the processing component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the processing component 102 can also include memory 608 that stores computer executable components and instructions. Furthermore, the processing component 102 can include a processor 606 to facilitate operation of the instructions (e.g., computer executable components and instructions) by the processing component 102.

The computing component 602 can receive input data (e.g., INPUT DATA shown in FIG. 6). In an aspect, the input data can correspond to the data 108 described with reference to FIG. 1. For example, the input data can be a portion (e.g., a section) of the data 108 and/or can be associated with a mini-batch for the data 108. The input data can be received, for example, via the network 106 (also described with reference to FIG. 1). For example, the input data can be received from a database in communication with the processing component 102 via the network 106. The input data can be data that is transmitted to the processing component 102 and other processing components associated with processing components $102_{1-N}$. In one example, the input data can be a portion of training data (e.g., a training set, a set of inputs, etc.) associated with a deep learning training process. Based on the input data, the computing component 602 can generate output data (e.g., OUTPUT DATA shown in FIG. 6). The output data can be generated, for example, in response to a deep learning processing (e.g. a deep learning process associated with the for the input data) that is performed by the computing component 602. In one example, the output data can be associated with a model (e.g., a current model) for a neural network associated with processing components $102_{1-N}$. In an aspect, the output data can be stored in the memory 608 or another memory associated with the processing component 102.

In an embodiment, the computing component 602 can include a machine learning component 603. The machine learning component 603 can perform a set of machine learning computations associated with the data 108. For example, the machine learning component 603 can perform a set of clustering machine learning computations, a set of decision tree machine learning computations, a set of instance-based machine learning computations, a set of regression machine learning computations, a set of regularization machine learning computations, a set of rule learning machine learning computations, a set of Bayesian machine learning computations and/or a set of different machine learning computations. In one example, the machine learning component 603 can perform a set of deep learning computations associated with the data 108. For example, the machine learning component 603 can perform a set of deep Boltzmann machine computations, a set of deep belief network computations, a set of convolution neural network computations, a set of stacked auto-encoder computations and/or a set of different deep learning computations.

The processing component 102 can also be in communication with the assignment component 104 (described with reference to FIG. 1) via the network 106. In an aspect, the processing component 102 can receive group data (e.g., GROUP DATA shown in FIG. 6) from the assignment component 104. The group data can include an indication of a group to which the processing component 102 is assigned. For example, the group data can indicate that the processing component 102 is assigned to a group that can also include the processing component 102 and one or more other processing components associated with processing components 102$_{1-N}$.

The communication component 604 can transmit the output data to the one or more other processing components associated with the group data. Furthermore, the communication component 604 can receive communication data (e.g., COMMUNICATION DATA shown in FIG. 6) from the one or more other processing components associated with the group data. The communication data can include a set of parameters (e.g., a set of model parameters for a model associated with the input data), a set of weights (e.g., a set of model weights for a model associated with the input data) and/or a set of gradients. Based on the communication data, the output data and/or the input data, the processing component 102 can generate other output data (e.g., OTHER OUTPUT DATA shown in FIG. 6). The other output data can be an updated version of the output data. For example, the other output data can be generated based on the input data, the communication data and the output data. In one example, the processing component 102 (e.g., the computing component 602) can generate an updated model by combining the model (e.g., the current model) and the communication data. The other output data can therefore represent a result of processing over the communication data, the input data and the updated model. In an aspect, the other output data can be stored in the memory 608 or another memory associated with the processing component 102. In another aspect, the other output data can be combined with the output data. A combination of the output data and the other output data can therefore be stored in the memory 608 or another memory associated with the processing component 102. For example, an average of the output data and the other output data can be stored in the memory 608 or another memory associated with the processing component 102. In another example, a weighted version of the output data and the other output data can be stored in the memory 608 or another memory associated with the processing component 102.

Moreover, the processing component 102 can receive other group data (e.g., OTHER GROUP DATA shown in FIG. 6) from the assignment component 104. The other group data can include an indication of another group for the processing component 102. For example, the other group data can indicate that the processing component 102 is assigned to another group that can also include the processing component 102 and one or more other processing components associated with processing components 102$_{1-N}$. The other group associated with the other group data can be different than the group associated with the group data. For example, the other group associated with the other group data can include at least one processing component that is not included in the group associated with the group data. Additionally or alternatively, the other group associated with the other group data can include a different number of processing components than the group associated with the group data. The communication component 604 can transmit the other output data to the one or more other processing components associated with the other group data. Furthermore, the communication component 604 can receive communication data (from the one or more other processing components associated with the other group data. The processing component 102 can continue receiving other group data and/or communication data (e.g., other communication data) until a deep learning process associated with the input data is complete. Furthermore, the processing component 102 can continue generating other output data (e.g., third output data, fourth output data, etc.) until a deep learning process associated with the input data is complete.

In a non-limiting example, the processing component 102 can correspond to processing component 102$_1$. As such, with respect to the example illustrated in FIG. 4, the group data received by the processing component 102 can indicate that the processing component 102 is included in the first group 402 with processing component 102$_3$ and processing component 102$_5$. Therefore, the processing component 102 can transmit the output data to the processing component 102$_3$ and the processing component 102$_5$. The processing component 102 can further receive communication data from the processing component 102$_3$ and the processing component 102$_5$. Moreover, the other group data received by the processing component 102 can indicate that the processing component 102 is included in the second group 404 with processing component 102$_4$ and processing component 102$_5$. Therefore, the processing component 102 can transmit the other output data to the processing component 102$_4$ and the processing component 102$_5$. The processing component 102 can further receive communication data from the processing component 102$_4$ and the processing component 102$_5$.

Similarly, with respect to the example illustrated in FIG. 5, the group data received by the processing component 102 can indicate that the processing component 102 is included in the first group 502 with processing component 102$_3$ and processing component 102$_5$. Therefore, the processing component 102 can transmit the output data to the processing component 102$_3$ and the processing component 102$_5$. The processing component 102 can further receive communication data from the processing component 102$_3$ and the processing component 102$_5$. Moreover, the other group data received by the processing component 102 can indicate that the processing component 102 is included in the second group 504 with processing component 102$_3$, processing component 102$_4$ and processing component 102$_5$. Therefore, the processing component 102 can transmit the other output data to the processing component $102_3$, the processing component $102_4$ and the processing component $102_5$. The processing component 102 can further receive communication data from the processing component $102_3$, the processing component $102_4$ and the processing component $102_5$.

Figure 7:
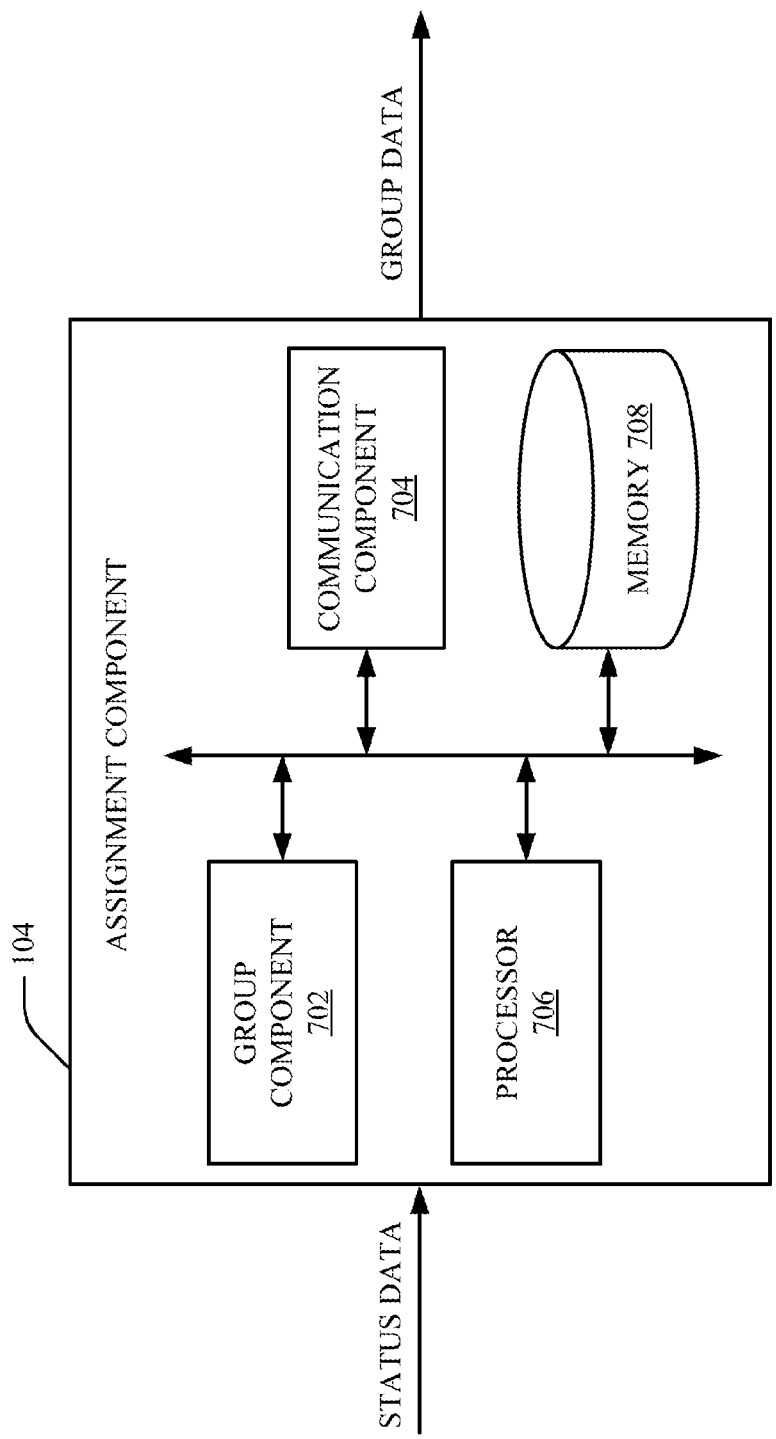
FIG. 7 illustrates a high-level block diagram of an example, non-limiting assignment component in accordance with one or more embodiments described herein.

FIG. 7 illustrates a high-level block diagram of an example, non-limiting assignment component in accordance with one or more embodiments described herein. Repetitive description of like elements employed in other embodiments described herein is omitted for sake of brevity.

As shown in FIG. 7, the assignment component 104 can also include a group component 702 and a communication component 704. Aspects of the assignment component 104 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the assignment component 104 can also include memory 708 that stores computer executable components and instructions. Furthermore, the assignment component 104 can include a processor 706 to facilitate operation of the instructions (e.g., computer executable components and instructions) by the assignment component 104.

In certain implementations, the assignment component 104 can receive status data (e.g., STATUS DATA shown in FIG. 7). The status data can be associated with a status for the processing components $102_{1-N}$ and/or data processed by the processing components $102_{1-N}$. For example, the status data can be indicative of a determination that a defined criterion associated with the processing components $102_{1-N}$ and/or processing of the data 108 by a processing component from the processing components $102_{1-N}$ is satisfied. In an aspect, the status data can include timing data associated with processing of the data 108 by the processing components $102_{1-N}$. The timing data can be associated with processing time of the data 108 (e.g., a finishing time for processing the data 108) by processing component from the processing components $102_{1-N}$. Additionally or alternatively, the status data can include location data (e.g., locality data) associated with a location of certain processing components $102_{1-N}$ with respect to other processing components $102_{1-N}$. The location data can indicate, for example, which processing components $102_{1-N}$ are implemented on a common computing device and/or a common processor.

Based on the status data, the group component 702 can generate group data (e.g., GROUP DATA shown in FIG. 7). The group data can include an indication of a group of processing components associated with processing components $102_{1-N}$ (e.g., the group data can be indicative of an identifier for a particular group of processing components within processing components $102_{1-N}$). For example, the group data can indicate that two or more particular processing components is assigned to a particular group. Processing components in the group determined by the group component 702 can exchange data. In an alternative implementation, the group component 702 can generate the group data without the status data. For example, the group component 702 can randomly generate the group data (e.g., the group component 702 can randomly assign two or more processing components to a group). In another example, the group component 702 can generate the group data based on a defined group list for the processing components $102_{1-N}$. The communication component 704 can transmit the group data to each of the processing components associated with the group data (e.g., each of the processing components included in the group indicated by the group data). The group data transmitted by the communication component 704 can be the group data received by the processing component 102 or the other group data received by the processing component 102.

In a non-limiting example, with respect to the example illustrated in FIG. 4, the assignment component 104 can receive, during a deep learning process, status data associated with at least processing component $102_1$, processing component $102_3$ and processing component $102_5$. Based on at least the status data associated with processing component $102_1$, processing component $102_3$ and processing component $102_5$, the group component 702 can assign the processing component $102_1$, the processing component $102_3$ and the processing component $102_5$ to the first group 402. Furthermore, the communication component 704 can transmit group data associated with the first group to the processing component $102_1$, the processing component $102_3$ and the processing component $102_5$. Similarly, with respect to the example illustrated in FIG. 4, the assignment component 104 can receive, also during the deep learning process, status data from at least processing component $102_1$, processing component $102_4$ and processing component $102_5$. Based on at least the status data associated with processing component $102_1$, processing component $102_4$ and processing component $102_5$, the group component 702 can assign the processing component $102_1$, the processing component $102_4$ and the processing component $102_5$ to the second group 404. Furthermore, the communication component 704 can transmit group data associated with the second group to the processing component $102_1$, the processing component $102_4$ and the processing component $102_5$.

In another non-limiting example, with respect to the example illustrated in FIG. 5, the assignment component 104 can receive, during a deep learning process, status data from at least processing component $102_1$, processing component $102_3$ and processing component $102_5$. Based on at least the status data associated with processing component $102_1$, processing component $102_3$ and processing component $102_5$, the group component 702 can assign the processing component $102_1$, the processing component $102_3$ and the processing component $102_5$ to the first group 502. Furthermore, the communication component 704 can transmit group data associated with the first group to the processing component $102_1$, the processing component $102_3$ and the processing component $102_5$. Similarly, with respect to the example illustrated in FIG. 5, the assignment component 104 can receive, also during the deep learning process, status data from at least processing component $102_1$, processing component $102_3$, processing component $102_4$ and processing component $102_5$. Based on at least the status data associated with processing component $102_1$, processing component $102_3$, processing component $102_4$ and processing component $102_5$, the group component 702 can assign the processing component $102_1$, the processing component $102_3$, the processing component $102_4$ and the processing component $102_5$ to the second group 504. Furthermore, the communication component 704 can transmit group data associated with the second group to the processing component $102_1$, the processing component $102_3$, the processing component $102_4$ and the processing component $102_5$.

While FIGS. 6 and 7 depict separate components in the processing component 102 and assignment component 104, respectively, it is to be appreciated that two or more components can be implemented in a common component.

Further, it is to be appreciated that the design of the processing component 102 and/or the assignment component 104 can include other component selections, component placements, etc., to facilitate processing for parallel deep learning and/or assignment of groups for parallel deep learning. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Figure 8:
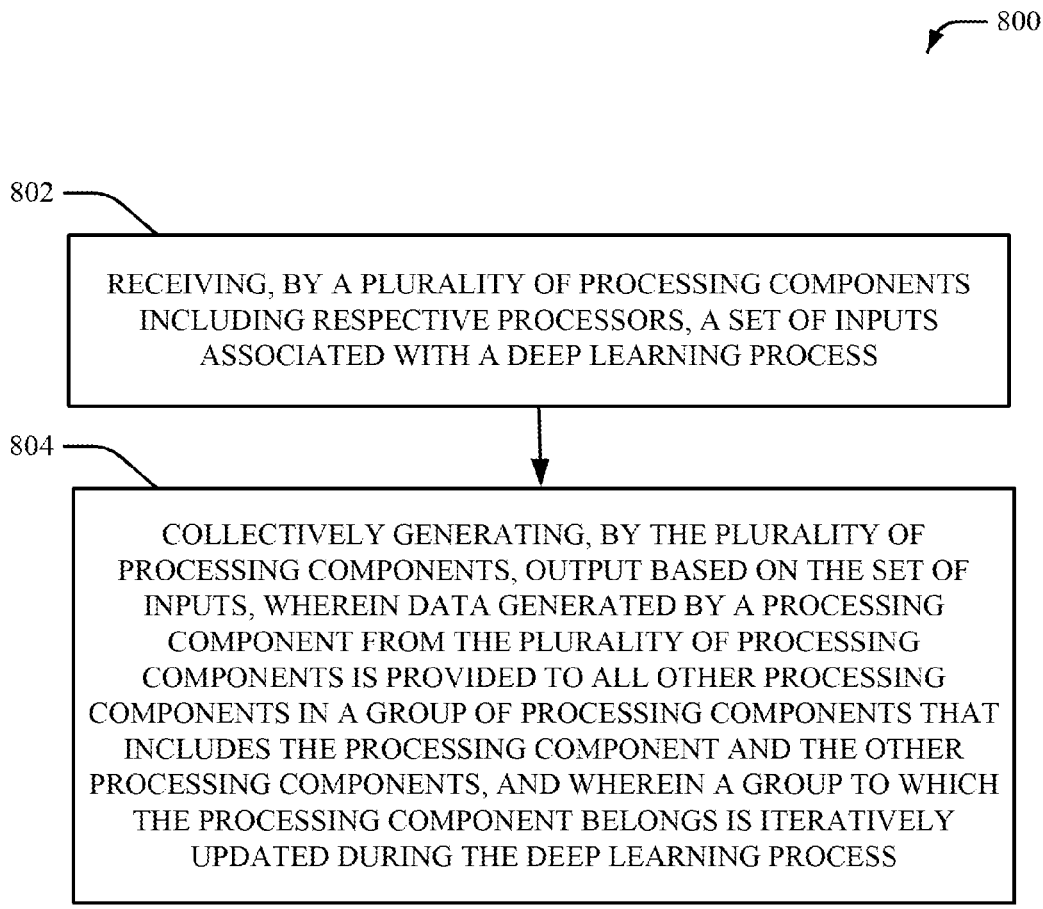
FIG. 8 illustrates a flow diagram of an example, non-limiting computer-implemented method that facilitates synchronization of deep learning among a plurality of processing components in accordance with one or more embodiments described herein.

FIG. 8 illustrates a flow diagram of an example, non-limiting computer-implemented method 800 that facilitates synchronization of deep learning among a plurality of processing components in accordance with one or more embodiments described herein. At 802, a set of inputs associated with a deep learning process is received by a plurality of processing components (e.g., by processing components $102_{1-N}$). For example, each of the processing components of the plurality of processing components can receive a different set of inputs associated with the deep learning process. The set of inputs can be associated with training data for the deep learning process. At 804, output is collectively generated by the plurality of processing components (e.g., by processing components $102_{1-N}$) based on the set of inputs, wherein data generated by a processing component from the plurality of processing components is provided to all other processing components in a group of processing components that can also include the processing component and the other processing components. Furthermore, a group to which the processing component belongs can be repeatedly changed during the deep learning process. For example, after each processing act during the deep learning process, the processing component can be assigned to a new group of processing components for exchanging data. As such, the plurality of processing components can independently perform the deep learning process to facilitate local amalgamation of data and computation of composite output associated with the plurality of processing components.

Figure 9:
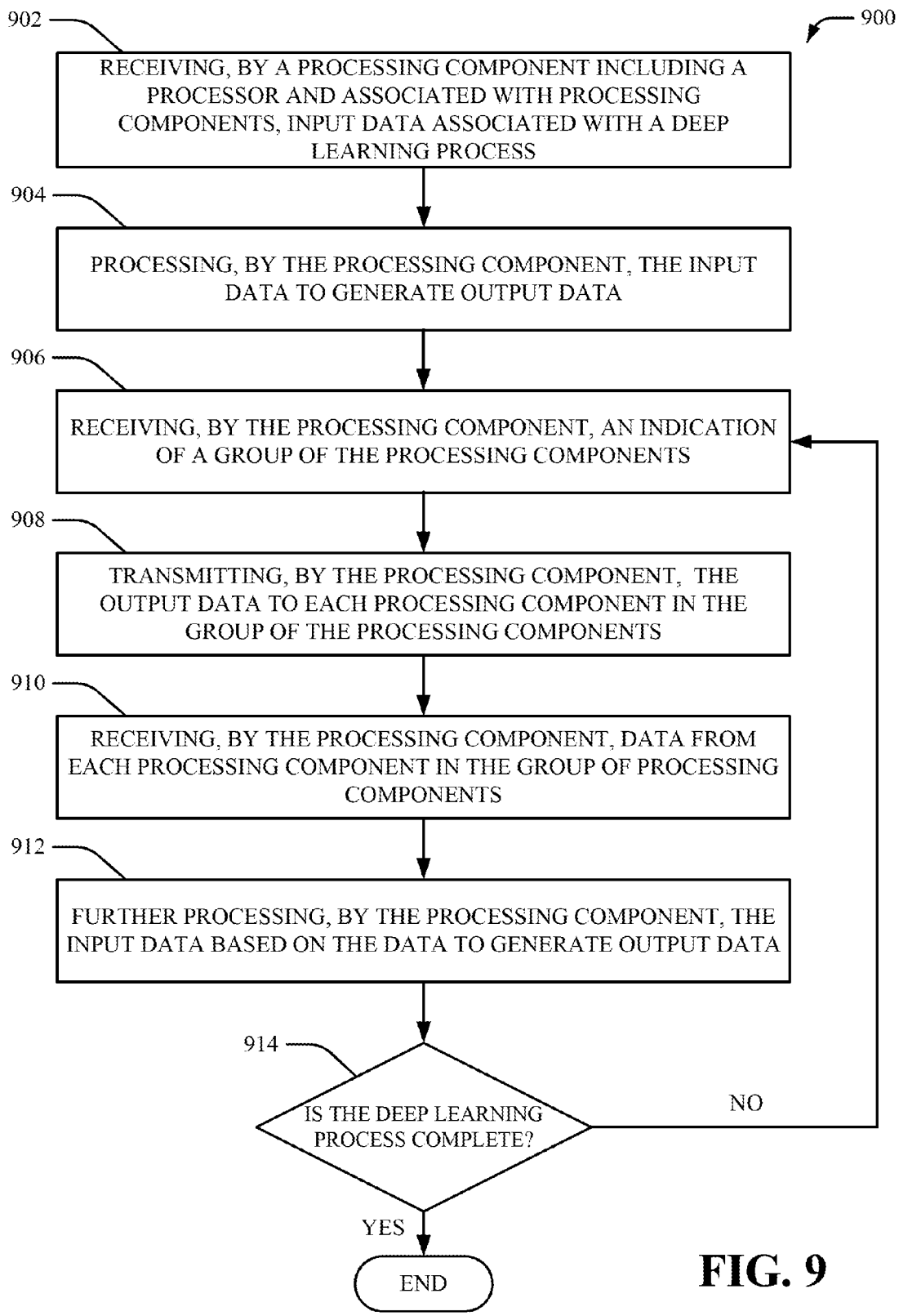
FIG. 9 illustrates a flow diagram of an example, non-limiting computer-implemented method that facilitates processing data associated with a deep learning process in accordance with one or more embodiments described herein.

FIG. 9 illustrates a flow diagram of an example, non-limiting computer-implemented method 900 that facilitates processing data associated with a deep learning process in accordance with one or more embodiments described herein. The computer-implemented methodology 900 can be associated with a processing component. At 902, input data associated with a deep learning process is received (e.g., by the computing component 602 of processing component 102). For example, the input data can be received via a network. In an aspect, the input data can be associated with training data stored in a database. For example, the input data can be a portion of the training data (e.g., a set of inputs associated with a training set). In another aspect, other portions of the training data can be transmitted to other processing components. At 904, the input data is processed (e.g., by the computing component 602 of processing component 102) to generate output data. At 906, an indication of a group of processing components is received (e.g., by the communication component 604 of processing component 102). For example, the indication of the group can be received via a network. Additionally, the indication of the group can be received from an assignment component. At 908, the output data is transmitted (e.g., by the communication component 604 of processing component 102) to each of the processing components in the group of processing components. At 910, data from each of the processing components in the group of processing components is received (e.g., by the communication component 604 of processing component 102). For example, a set of parameters from each of the processing components in the group of processing components can be received. In another example, a set of weights from each of the processing components in the group of processing components can be received. In yet another example, a set of gradients from each of the processing components in the group of processing components can be received. At 912, the input data is further processed (e.g., by the computing component 602 of processing component 102) based on the data to generate output data. At 914, it is determined (e.g., by the computing component 602 of processing component 102) whether the deep learning process is complete. If the deep learning process is not complete, the methodology 900 returns to 906. If the deep learning process is complete, the methodology 900 ends. For example, the output data generated by further processing the input data based on the data can be combined with other data associated with other processing components involved in the deep learning process. As such, composite output data associated with the group of processing components can be generated. Additionally or alternatively, the output data generated by further processing the input data based on the data can be stored in a memory and/or transmitted to a remote device (e.g., a server device) via a network.

Figure 10:
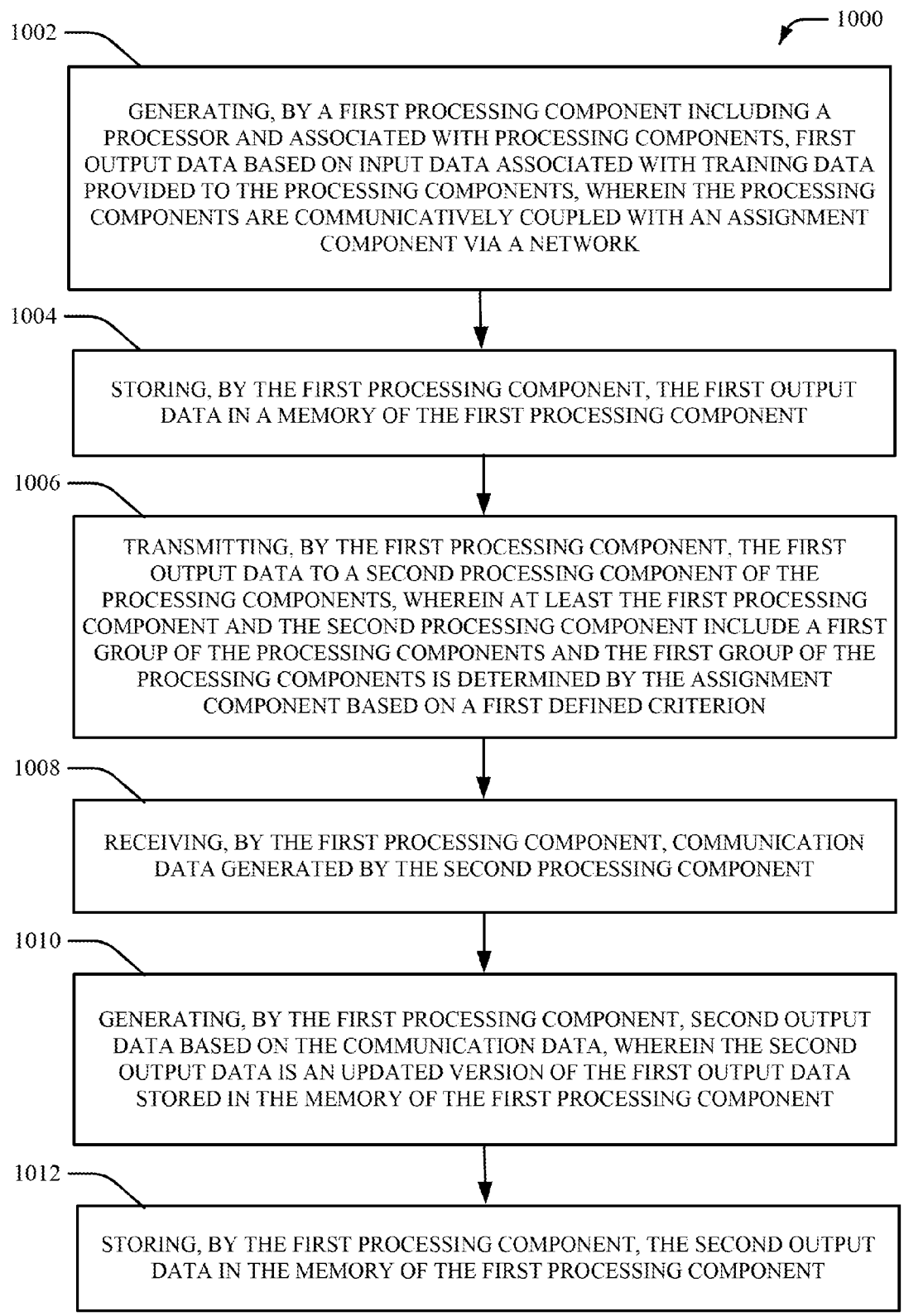
FIG. 10 illustrates a flow diagram of an example, non-limiting computer-implemented method that facilitates generating output associated with a deep learning process in accordance with one or more embodiments described herein.

FIG. 10 illustrates a flow diagram of an example, non-limiting computer-implemented method 1000 that facilitates generating output associated with a deep learning process in accordance with one or more embodiments described herein. At 1002, first output data is generated, by a processing component (e.g., by a processing component from processing components $102_{1-N}$) based on input data associated with training data provided to the processing components, wherein the processing components are communicatively coupled with an assignment component via a network. The input data can be associated with a training set for a deep learning process. At 1004, the first output data is stored, by the first processing component (e.g., by the processing component from processing components $102_{1-N}$), in a memory of the first processing component. At 1006, the first output data is transmitted, by the first processing component, to a second processing component of the processing components, wherein at least the first processing component and the second processing component comprise a first group of the processing components and the first group of the processing components is determined by the assignment component based on a first defined criterion. At 1008, communication data generated by the second processing component is received by the first processing component (e.g., by the processing component from processing components $102_{1-N}$). The communication data can include a set of parameters, a set of weights and/or a set of gradients for a model associated with the training set. At 1010, second output data is generated, by the first processing component (e.g., by the processing component from processing components $102_{1-N}$), based on the communication data, wherein the second output data is an updated version of the first output data stored in the memory of the first processing component. At 1012, the second output data is stored, by the first processing component (e.g., by the processing component from processing components $102_{1-N}$), in the memory of the first processing component. Accordingly, the first processing component can independently process the input data (e.g., the input data associated with the training set for the deep learning process) based on learning performed by the first processing component and other learning performed by at least one other processing component (e.g., at least the second processing component).

Figure 11:
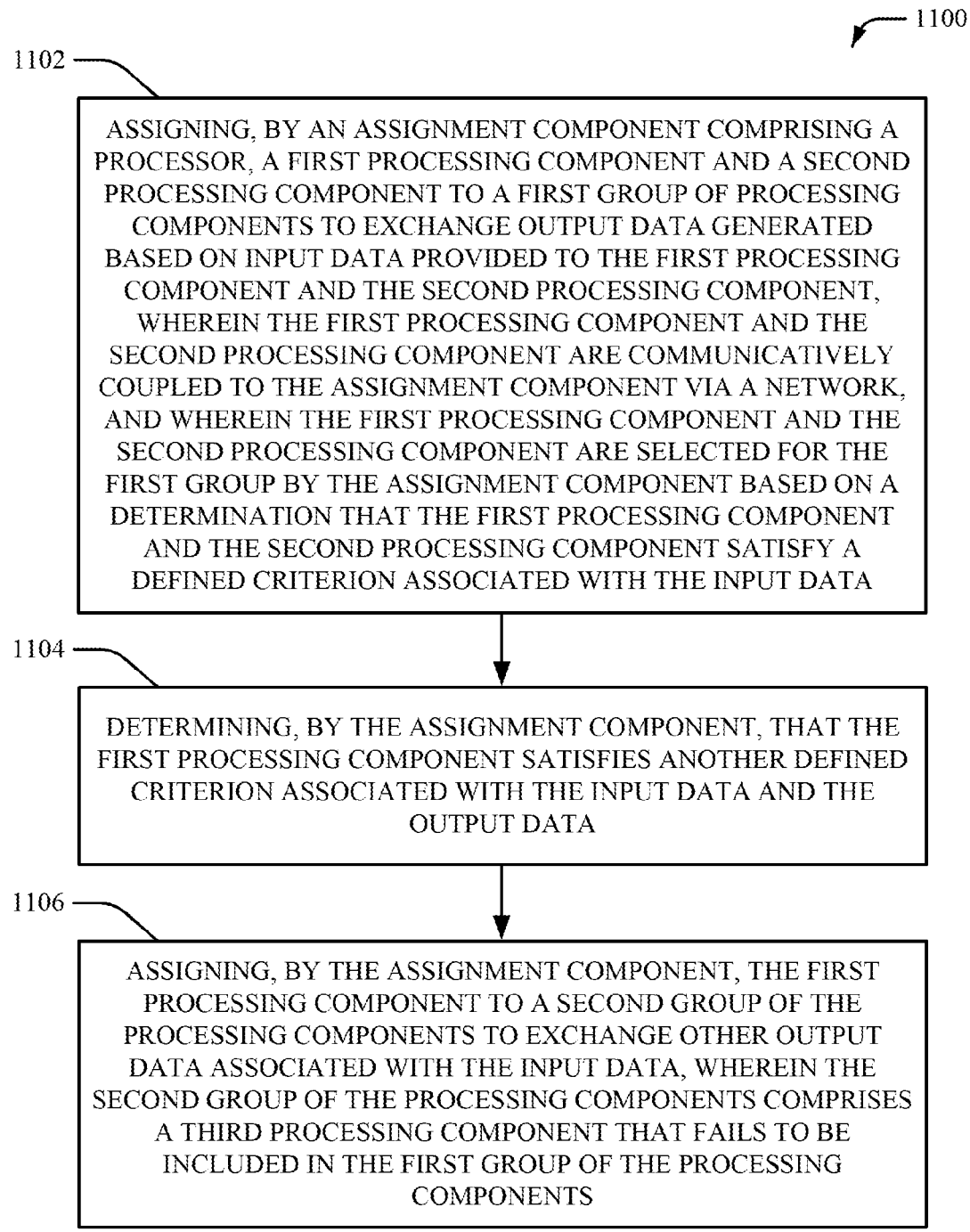
FIG. 11 illustrates a flow diagram of an example, non-limiting computer-implemented method that facilitates assigning groups for a deep learning process in accordance with one or more embodiments described herein.

FIG. 11 illustrates a flow diagram of an example, non-limiting computer-implemented method 1100 that facilitates assigning groups for a deep learning process in accordance with one or more embodiments described herein. At 1102, a first processing component and a second processing component are assigned, by an assignment component comprising a processor (e.g., by the group component 702 of the assignment component 104), to a first group of processing components to exchange output data generated based on input data provided to the first processing component and the second processing component, wherein the first processing component and the second processing component are in communication with the assignment component via a network. Furthermore, the first processing component and the second processing component are selected for the first group based on a determination that the first processing component and the second processing component satisfy a defined criterion with respect to the input data. In an implementation, the input data can be associated with a training set for a deep learning process. At 1104, it is determined, by the assignment component (e.g., by the group component 702 of the assignment component 104), that the first processing component satisfies another defined criterion with respect to the input data and the output data. At 1106, the first processing component is assigned, by the assignment component (e.g., by the group component 702), to a second group of the processing components to exchange other output data associated with the input data, wherein the second group of the processing components comprises a third processing component that fails to be included in the first group of the processing components. Additionally or alternatively, the second group of the processing components can comprise a different number of processing components than the first group. Accordingly, the first processing component can communicate with different groups of processing components and/or can exchange information with different groups of processing components at different times during a deep learning process.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because configuration of data packet(s) and/or communication between processing components and/or an assignment component is established from a combination of electrical and mechanical components and circuitry, a human is unable to replicate or perform the subject data packet configuration and/or the subject communication between processing components and/or an assignment component. For example, a human is unable to generate data for transmission over a wired network and/or a wireless network between processing components and/or an assignment component, etc. Moreover, a human is unable to packetize data that can include a sequence of bits corresponding to information generated during a machine learning process (e.g., a deep learning process), transmit data that can include a sequence of bits corresponding to information generated during a machine learning process (e.g., a deep learning process), etc.

Figure 12:
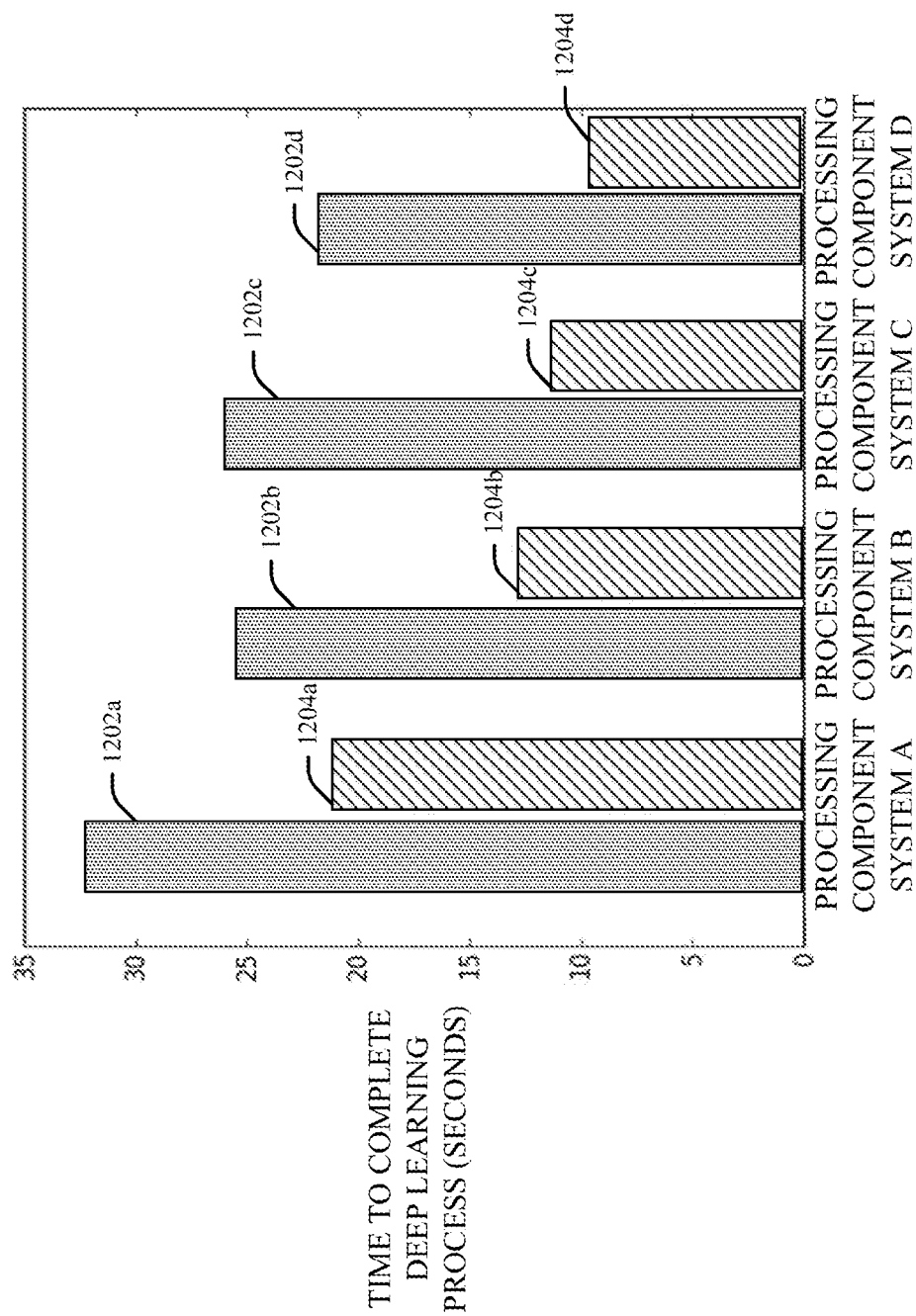
FIG. 12 illustrates a graph of example, non-limiting execution time resultant from a deep learning process in accordance with one or more embodiments described herein.

FIG. 12 is a graph 1200 of example, non-limiting execution time resultant from a deep learning process in accordance with one or more embodiments described herein. An x-axis of graph 1200 depicts different processing component systems including processing component system A, processing component system B, processing component system C and processing component system D. Processing component systems A-D can include, for example, different number of processing components. Furthermore, processing component systems A-D can receive corresponding data to execute a deep learning process. A y-axis of graph 1200 depicts an amount of time to complete a deep learning process in seconds). Graph elements 1202a-d respectively depict execution times for executing a deep learning process among processing component systems A-D via a deep learning technique with a centralized entity (e.g., a centralized storage entity and/or a centralized processing entity) for gathering, storing and/or processing data generated by processing components during a deep learning process. Graph elements 1204a-d respectively depict execution times for executing a deep learning process among processing component systems A-D via a novel synchronization technique for parallel deep learning in which processing components are dynamically grouped during a deep learning process, in accordance with one or more of the embodiments disclosed herein. As shown in graph 1200, in one or more embodiments, improved execution time for a deep learning process can be achieved (e.g., by reducing communication time among processing components, by reducing bandwidth utilization for a network associated with processing components, etc.) via novel synchronization techniques for parallel deep learning in which processing components are dynamically grouped during a deep learning process, in accordance with one or more of the embodiments disclosed herein.

Figure 13:
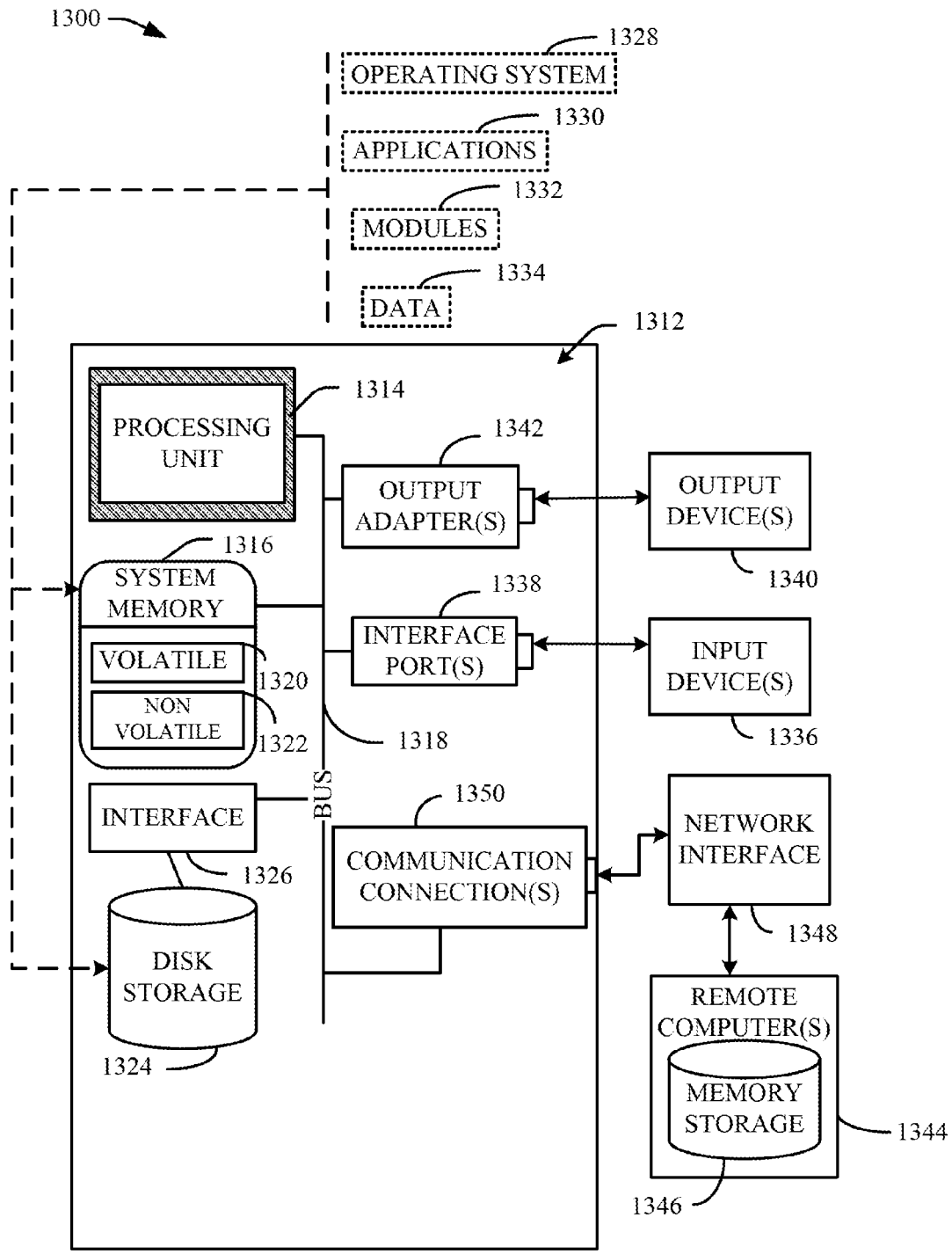
FIG. 13 illustrates a block diagram of an example, non-limiting operating environment in which one or more embodiments described herein can be facilitated.

In order to provide a context for the various aspects of the disclosed subject matter, FIG. 13 as well as the following discussion are intended to provide a general description of a suitable environment in which the various aspects of the disclosed subject matter can be implemented. FIG. 13 illustrates a block diagram of an example, non-limiting operating environment in which one or more embodiments described herein can be facilitated. Repetitive description of like elements employed in other embodiments described herein is omitted for sake of brevity. With reference to FIG. 13, a suitable operating environment 1300 for implementing various aspects of this disclosure can also include a computer 1312. The computer 1312 can also include a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314. The system bus 1318 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI). The system memory 1316 can also include volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable programmable ROM (EEPROM), flash memory, or nonvolatile random access memory (RAM) ferroelectric RAM (FeRAM). Volatile memory 1320 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1312 can also include removable/non-removable, volatile/nonvolatile computer storage media. FIG. 13 illustrates, for example, a disk storage 1324. Disk storage 1324 can also include, but is not limited to, devices like a magnetic disk drive, floppy disk drive, tape drive, Jaz drive, Zip drive, LS-100 drive, flash memory card, or memory stick. The disk storage 1324 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1324 to the system bus 1318, a removable or non-removable interface is typically used, such as interface 1326. FIG. 13 also depicts software that acts as an intermediary between users and the basic computer resources described in the suitable operating environment 1300. Such software can also include, for example, an operating system 1328. Operating system 1328, which can be stored on disk storage 1324, acts to control and allocate resources of the computer 1312. System applications 1330 take advantage of the management of resources by operating system 1328 through program modules 1332 and program data 1334, e.g., stored either in system memory 1316 or on disk storage 1324. It is to be appreciated that this disclosure can be implemented with various operating systems or combinations of operating systems. A user enters commands or information into the computer 1312 through input device(s) 1336. Input devices 1336 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port can be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a computer, a server, a router, a network PC, a workstation, a microprocessor based appliance, a peer device or other common network node and the like, and typically can also include many or all of the elements described relative to computer 1312. For purposes of brevity, only a memory storage device 1346 is illustrated with remote computer(s) 1344. Remote computer(s) 1344 is logically connected to computer 1312 through a network interface 1348 and then physically connected via communication connection 1350. Network interface 1348 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1350 refers to the hardware/software employed to connect the network interface 1348 to the system bus 1318. While communication connection 1350 is shown for illustrative clarity inside computer 1312, it can also be external to computer 1312. The hardware/software for connection to the network interface 1348 can also include, for exemplary purposes only, internal and external technologies such as, modems including regular telephone grade modems, cable modems and DSL modems. ISDN adapters, and Ethernet cards.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for deep learning, the computer program product comprising a non-transitory computer readable storage medium having program instructions embodied therewith, the program instructions executable by a processing component to cause the processing component to:

generate, by the processing component, first output data based on first input data associated with machine learning and received by the processing component and one or more other processing components;

transmit, by the processing component, the first output data to a first processing component from the one or more other processing components, wherein the first processing component is determined by the processing component or the one or more other processing components, wherein the processing component and the first processing component are operated in synchronization for the deep learning, and wherein the first output data is stored in a memory operatively coupled to the processing component;

generate, by the processing component, second output data based on the first output data and communication data that is generated by the first processing component; and transmit, by the processing component, the second output data to a second processing component from the processing component, wherein the second processing component is determined by the processing component or the one or more other processing components, and wherein the processing component and the second processing component are operated in synchronization for the deep learning.

2. The computer program product of claim 1, wherein the program instructions are further executable by the processing component to cause the processing component to:

receive, by the processing component, other communication data generated by the second processing component.

3. The computer program product of claim 2, wherein the program instructions are further executable by the processing component to cause the processing component to:

generate, by the processing component, third output data based on the second output data and the other communication data; and transmit, by the processing component, the third output data to a third processing component from the processing components that is determined by the processing component or the one or more other processing components, wherein the third processing component is determined randomly by the processing component or the one or more other processing components.

4. The computer-implemented method of claim 1, wherein the one or more processing components are determined based on a defined list of processing engines by the processing component.

5. The computer-implemented method of claim 1, wherein the first input data is retrieved from a database to which the one or more processing components are communicatively coupled via a network.

6. The computer-implemented method of claim 1, wherein the machine learning is selected from a group consisting of clustering machine learning computations, decision tree machine learning computations and instance-based machine learning computations.

7. The computer-implemented method of claim 1, wherein the machine learning is selected from a group consisting of regression machine learning computations, regularization machine learning computations, rule learning machine learning computations, and Bayesian machine learning computations.

8. A computer-implemented method comprising:

generating, by the processing component, first output data based on first input data associated with machine learning and received by the processing component and one or more other processing components;

transmitting, by the processing component, the first output data to a first processing component from the one or more other processing components, wherein the first processing component is determined by the processing component or the one or more other processing components, wherein the processing component and the first processing component are operated in synchronization for the deep learning, and wherein the first output data is stored in a memory operatively coupled to the processing component;

generating, by the processing component, second output data based on the first output data and communication data that is generated by the first processing component; and transmitting, by the processing component, the second output data to a second processing component from the processing component, wherein the second processing component is determined by the processing component or the one or more other processing components, and wherein the processing component and the second processing component are operated in synchronization for the deep learning.

9. The computer-implemented method of claim 8, further comprising:

receiving, by the processing component, other communication data generated by the second processing component.

10. The computer-implemented method of claim 9, further comprising:

generating, by the processing component, third output data based on the second output data and the other communication data.

11. The computer-implemented method of claim 10, further comprising:

transmitting, by the processing component, the third output data to a third processing component from the processing components that is determined by the processing component or the one or more other processing components.

12. The computer-implemented method of claim 11, wherein the third processing component is determined randomly by the processing component or the one or more other processing components.

13. The computer-implemented method of claim 8, wherein the one or more processing components are determined randomly by the processing component.

14. The computer-implemented method of claim 8, wherein the one or more processing components are determined based on a defined list of processing engines by the processing component.

15. The computer-implemented method of claim 8, wherein the first input data is retrieved from a database to which the one or more processing components are communicatively coupled via a network.

16. The computer-implemented method of claim 8, wherein the machine learning is selected from a group consisting of clustering machine learning computations, decision tree machine learning computations and instance-based machine learning computations.

17. The computer-implemented method of claim 8, wherein the machine learning is selected from a group consisting of regression machine learning computations, regularization machine learning computations, rule learning machine learning computations, and Bayesian machine learning computations.

\* \* \* \* \*